(12) United States Patent
van Veggel et al.

(10) Patent No.: US 8,066,908 B2
(45) Date of Patent: Nov. 29, 2011

(54) PRODUCTION OF LIGHT FROM SOL-GEL DERIVED THIN FILMS MADE WITH LANTHANIDE DOPED NANOPARTICLES, AND PREPARATION THEREOF

(75) Inventors: Franciscus C. J. M. van Veggel, Victoria (CA); Sri Sivakumar, Tamilnadu (IN); Thampi V. Sudarsan, Victoria (CA)

(73) Assignee: UVic Industry Partnerships Inc., Victoria, British Columbia (CA)

( * ) Notice: Subject to any disclaimer, the term of this patent is extended or adjusted under 35 U.S.C. 154(b) by 787 days.

(21) Appl. No.: 11/912,884

(22) PCT Filed: Apr. 26, 2006

(86) PCT No.: PCT/CA2006/000681
§ 371 (c)(1),
(2), (4) Date: May 20, 2008

(87) PCT Pub. No.: WO2006/113998
PCT Pub. Date: Nov. 2, 2006

(65) Prior Publication Data
US 2008/0290318 A1    Nov. 27, 2008

Related U.S. Application Data

(60) Provisional application No. 60/675,164, filed on Apr. 26, 2005, provisional application No. 60/685,677, filed on May 26, 2005.

(51) Int. Cl.
  *C09K 11/00* (2006.01)
  *H01L 21/00* (2006.01)
  *H01L 33/00* (2010.01)
(52) U.S. Cl. ... 252/301.4 H; 252/301.4 R; 252/301.4 F; 428/690; 427/162; 427/226; 427/240; 427/372.2

(58) Field of Classification Search ........... 252/301.4 H, 252/301.4 F, 301.4 R; 428/690; 427/162, 427/226, 240, 372.2
See application file for complete search history.

(56) References Cited

U.S. PATENT DOCUMENTS 6,699,406 B2 *   3/2004   Riman et al. ............. 252/301.36
7,094,361 B2 *   8/2006   Riman et al. ............. 252/301.36

FOREIGN PATENT DOCUMENTS

| CA | 2523027 | 11/2004 |
| WO | WO 2004/085571 | * 10/2004 |

OTHER PUBLICATIONS

Written Opinion of the International Searching Authority, PCT/CA2006/000681, filed Apr. 26, 2006.
International Search Report, PCT/CA2006/000681, filed Apr. 26, 2006.

* cited by examiner

*Primary Examiner* — Carol M Koslow
(74) *Attorney, Agent, or Firm* — Klarquist Sparkman, LLP

(57) ABSTRACT

A method of preparing a lanthanide-doped nanoparticle sol-gel matrix film having a high signal to noise ratio is provided. The sol-gels are also provided. A method of preparing light emitting sol-gel films made with lanthanide doped nanoparticles, for the production of white light is also provided. The method comprises selecting lanthanides for the production of at least one of green, red and blue light when excited with near infrared light, preparing nanoparticles comprising the selected lanthanides, stabilizing the nanoparticles with ligands operative to stabilize the nanoparticles in an aqueous solution and selected to be substantially removed from the sol-gel matrix film during synthesis, incorporating the stabilized nanoparticles into a sol-gel matrix and heating to increase the signal to noise ratio of the luminescence by substantially removing the low molecular weight organic molecules. Additionally, light emitting sol-gel films made with lanthanide doped nanoparticles are provided.

26 Claims, 24 Drawing Sheets

Figure 1:
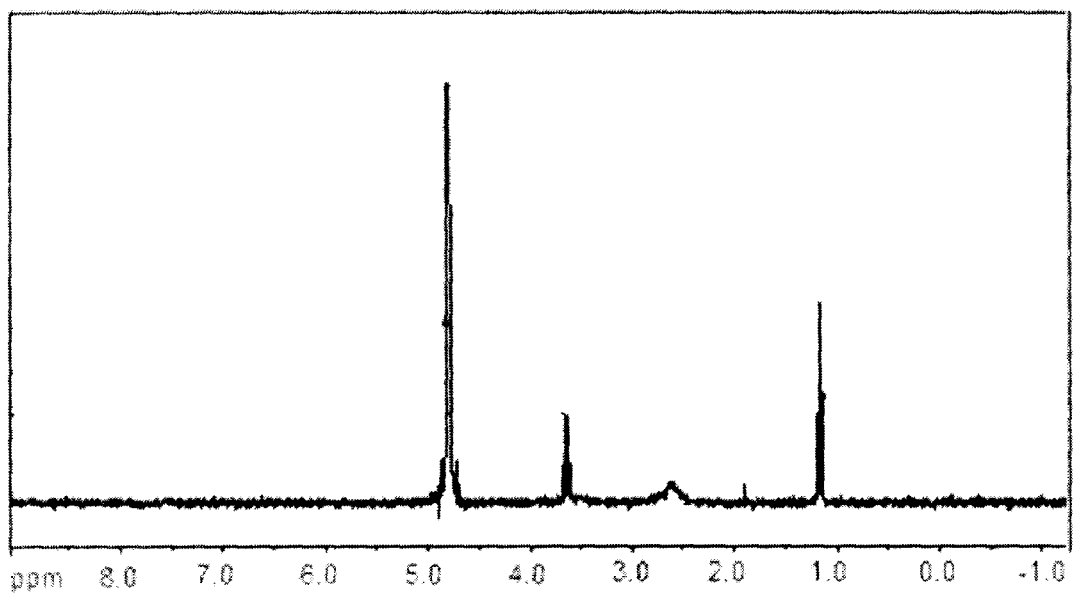

PRODUCTION OF LIGHT FROM SOL-GEL DERIVED THIN FILMS MADE WITH LANTHANIDE DOPED NANOPARTICLES, AND PREPARATION THEREOF

CROSS REFERENCE TO RELATED APPLICATIONS

This is the U.S. National Stage of International Application No. PCT/CA2006/000681 filed Apr. 26, 2006, which was published in English under PCT Article 21(2), which in turn claims the benefit of U.S. Provisional Applications No. 60/675,164, filed Apr. 26, 2005 and No. 60/685,677, filed May 26, 2005. All three applications are incorporated herein in their entirety.

FIELD

The present application relates to films that are prepared by the sol-gel method made with lanthanide doped nanoparticles. The films can comprise silica, zirconia or alumina. The nanoparticles can be tuned to produce visible, including white and near-infrared light. More specifically, the application relates to pumping near infrared light into sol-gel derived thin film made with $Ln^{3+}$ doped $LaF_3$ nanoparticles to produce bright white light.

BACKGROUND

The sol-gel process is one of the most widely used methods for the preparation of bulk materials and thin films used in integrated optics (IO) circuits.[1] The major advantages of the process are its simplicity and its ability to control the purity and homogeneity of the final material on a molecular level. The method offers the possibility of modifying the refractive index, phonon energy, and transparency of a material by choosing suitable matrices like $SiO_2$, $TiO_2$, $ZrO_2$, $Al_2O_3$, $GeO_2$, etc.,[2-6] either individually or in combination. Such matrices are potential candidates for making planar waveguides, fiber amplifiers, and up-conversion devices, when doped with trivalent lanthanide (also known as rare earth) ions.[7-9] Preparation of these matrices involves the direct doping of the materials with $Ln^{3+}$ ions. The most commonly used lanthanide ion for these applications is $Er^{3+}$, as it provides amplification in the 1550 nm communication window, through its $^4I_{13/2} \rightarrow {}^4I_{15/2}$ transition. Improvements are still needed to optimize performance.

It is desirable to have a high quantum yield and an increased line width for this transition, to enable those materials to be used for broad-band near-infrared amplification. The three main factors that decide the performance characteristics of such lanthanide ion containing materials are the phonon energy of the host in which the lanthanide ions are incorporated, the proximity of the OH groups present in the matrix to the lanthanide ions, and clustering of lanthanide ions. For example in $Er^{3+}$ incorporated materials, high phonon energy of the host matrix favors the non-radiative relaxation of the $^4I_{13/2}$ excited state, thereby reducing its life time and quantum yield of the $^4I_{13/2} \rightarrow {}^4I_{15/2}$ transition. Because the OH groups, an inherent result of sol-gel process, quench the excited state of the lanthanide ions by dipole-dipole interaction, the proximity of the OH groups to the lanthanide ions, results in a much higher extent of quenching. Finally, clustering of the lanthanide ions reduce the excited state lifetime by concentration quenching.[10-11] Several reports are available regarding ways to improve the luminescence characteristics of such materials. These mainly include the works of Biswas et al[12-13] and Tanabe et al,[14] on the sol-gel glasses and glass ceramics containing $Er^{3+}$ ions.

Glass-ceramics are usually made by a two step procedure involving the formation of the glass by melting the reagents together at high temperature and quenching, followed by a programmed heat treatment. During the heat treatment, separation of the $LaF_3$ or lanthanide ion doped $LaF_3$ takes place. This method is also not readily applicable to the formation of thin films. Furthermore, these materials have only limited applications as they need to be melted at higher temperature to draw them into fibers. Fiber amplifiers are less convenient for integrated optics because of their increased length and extensive research is going on to replace them with planar waveguide amplifiers.[15] A lifetime of 17 ms for the $^4I_{13/2}$ of $Er^{3+}$ was reported by Slooff et al.[16] for $Er^{3+}$ ion implanted silica colloidal particles having sizes in the range of 240-360 nm and annealed over the temperature range of 700-900° C. This was attributed to the decreased OH concentration in these materials. The disadvantage of this method is that the ion implantation is a small area, low throughput procedure.

Lanthanide ions like $Er^{3+}$, $Nd^{3+}$, etc., have been demonstrated to undergo clustering when incorporated in a silica matrix. Clustered rare earth ions have shorter lifetime compared to the non-clustered ones.

In some matrices some $Ln^{3+}$ ions are not emissive. For instance, $Ho^{3+}$ directly doped into $SiO_2$ does not emit light, but via the $Ho^{3+}$ doped $LaF_3$ nanoparticles they do.

A general method, from readily available starting materials, that combines the advantage of the improved luminescent properties of $Ln^{3+}$-doped $LaF_3$ nanoparticles and the simplicity of making thin films using sol-gel method, is thus highly desirable.

There is a large interest in cheap efficient generation of (white) light for a variety of purposes such as displays, LCD back light and general lighting appliances. In particular, there is an interest in replacing the incandescent light bulb.[17-19] There are three basic approaches to the attainment of white light: i) the conversion of electricity; ii) the conversion of light, either by down-conversion or up-conversion; and iii) thermal radiation in the incandescent lamb to achieve white light.

Electricity is used in light-emitting diodes. There have been some major advances over the last few years in organic light-emitting diodes (OLEDs)[20-23] and polymer light-emitting diodes (PLEDs).[24-26] However, the generation of white light from OLEDs and PLEDs has proven to be challenging because: 1) blue and white light emitters are not as efficient as green and red emitters;[27,28] 2) energy down conversion in the case of multilayer devices, i.e. blue light can easily be absorbed by green chromophore and green light can be absorbed by red chromophore which results in one colour emission that depends on their efficiency; 3) bias dependant colour variation i.e. recombination zone of hole and electron is shifted at different bias which leads to different mobility of the charge carriers;[29] 4) many layers are involved in the multilayer devices which leads to high manufacturing cost;[30] and 5) long term stability of emitters such as N—N'-diphenyl-N, N'-bis(3-methyl phenyl)-1,1'-biphenyl-4,4'-diamine (TPD), tris(8-quinolinolato) aluminum ($Alq_3$).[31]

Down conversion is the conversion of higher energy UV light into visible light and is widely exploited in phosphors.[32] The short-wavelength emitting light sources can be used as efficient pumps to excite organic and inorganic luminescent matrices for subsequent photon emission at lower energies. The main challenge of this process is the degradation of the emitting material, especially in the organic emitting materials, over time because of photodecomposition and other means, as would be known to one skilled in the art.

One of the oldest devices for the production of white light is an incandescent light bulb. An incandescent light bulb produces light by heating a small filament of tungsten to about 2500° C. Despite many years of use, the efficiency (10-12%) is very low.[33]

Up-conversion converts cheap near infrared photons via multiphoton processes into visible photons[34]. Up-conversion is based on sequential absorption and energy transfer steps involving real metastable excited state that is intermediate in energy between the ground state and the emitting state of the ion. This process requires the absorption of at least two photons to provide sufficient energy for the up-converted emission to occur. This process is different from multiphoton absorption process which occurs through the simultaneous absorption of two or more photons via a non-stationary virtual quantum mechanical state in a medium, requiring high excitation densities.

Lanthanide ions are suitable candidates for up-conversion processes because of their crystal field-split (stark) level structure that provides many intermediate levels with favorable spacing and their long-lived excited states. Moreover, cheap NIR diode continuous wave (CW) laser can be used as excitation source.

In order to achieve an efficient, cost effective and durable white light source, the following points may be considered: i) stable photocycle of the emitting species; ii) one cheap excitation source (e.g. 980 nm CW laser) and efficient absorption; iii) easy control over the luminescence intensity of red, green, and blue emission; and iv) easy and cost effective fabrication of the device. It is an object of the invention to overcome the deficiencies in the prior art.

SUMMARY

A method of preparing a lanthanide-doped product nanoparticle sol-gel matrix film is provided. The method comprises preparing precursor nanoparticles; stabilizing the nanoparticles with ligands operative to stabilize the nanoparticles in an aqueous solution and selected to be substantially removed from the sol-gel matrix film during synthesis; incorporating the stabilized nanoparticles into a sol-gel matrix, and heating the lanthanide doped nanoparticle sol-gel matrix to a temperature suitably selected to increase the signal to noise ratio by substantially removing the low molecular weight organic molecules water and hydroxyl groups thereby preparing a lanthanide-doped product nanoparticle sol-gel matrix film.

In one aspect of the invention the ligands are with low molecular weight organic molecules.

In another aspect of the invention, the low molecular weight organic molecules comprise at least one negatively charged group.

In one aspect of the invention, the low molecular weight organic molecules are carboxylates.

In another aspect of the invention, the carboxylate is citrate.

In another aspect of the invention, the temperature is in the range of 400-1200 C.

In another aspect of the invention, the temperature is in the range of 600-1200 C.

In another aspect of the invention, the temperature is approximately 800 C.

In another aspect of the invention, the method further comprises spin coating the sol-gel.

In another aspect of the invention, the sol-gel matrix comprises at least one of silica, alumina, zirconia, titania, hafnia, tantalum pentoxide, niobium pentoxide, germanium dioxide, yttria ($Y_2O_3$), and gadolinia ($Gd_2O_3$).

In another aspect of the invention, the precursor nanoparticles are selected from the group consisting of $LaF_3$:Ln (Ln=Ce, Pr, Nd, Sm, Eu, Gd, Tb, Dy, Ho, Er, Tm, Yb).

In another aspect of the invention the precursor nanoparticles are selected from the group consisting of $La_{0.75}Yb_{0.2}Ho_{0.05}F_3$, $La_{0.45}Yb_{0.5}Er_{0.05}F_3$, for the production of green and red light, $La_{0.75}Yb_{0.2}Tm_{0.05}F_3$, for the production of blue light, $Yb_{0.75}La_{0.20}Eu_{0.05}F_3$ for the production of red light, $Yb_{0.75}La_{0.20}Tb_{0.05}F_3$ for the production of green, $La_{0.45}Yb_{0.5}Er_{0.05}F_3$ for the production of green and red, $La_{0.75}Yb_{0.2}Ho_{0.05}F_3$ for the production of green and red, $Yb_{0.75}La_{0.20}Tb_{0.05}F_3$ for the production of green and some orangey red, $Yb_{0.75}La_{0.20}Eu_{0.05}F_3$ for the production of red and $La_{0.75}Yb_{0.2}Tm_{0.05}F_3$ for the production of blue.

In another aspect of the invention the precursor nanoparticles are selected from the group consisting of $LaF_3$:Ln (Ln=$Yb^{3+}Eu^{3+}Er^{3+}Tm^{3+}Ho^{3+}Tb^{3+}$) and combinations thereof.

In another aspect of the invention the nanoparticles are synthesized in a ratio of about 150 $La_{0.75}Yb_{0.2}Tm_{0.05}F_3$, to 0.5 $La_{0.45}Yb_{0.5}Er_{0.05}F_3$ to 0.5 $La_{0.75}Yb_{0.2}Ho_{0.05}F_3$ or 100 $La_{0.75}Yb_{0.2}Tm_{0.05}F_3$, to 0.5 $La_{0.45}Yb_{0.5}Er_{0.05}F_3$ to 100 $La_{0.20}Yb_{0.75}Tb_{0.05}F_3$ or 100 $La_{0.75}Yb_{0.2}Tm_{0.05}F_3$, to 80 $Yb_{0.75}La_{0.2}Eu_{0.05}F_3$ to 80 $La_{0.20}Yb_{0.75}Tb_{0.05}F_3$ or 150 $La_{0.75}Yb_{0.2}Tm_{0.05}F_3$, to 1 $La_{0.20}Yb_{0.75}Er_{0.05}F_3$.

In another aspect of the invention, the precursor nanoparticles are core-shell nanoparticles.

In another aspect of the invention, the shell comprises $LaF_3$.

Another embodiment of the invention provides a lanthanide doped nanoparticle sol-gel film prepared by any of the above methods.

Another embodiment of the invention provides a lanthanide-doped nanoparticle sol-gel film comprising a nanoparticle selected from the group consisting of $LaF_3$:Ln (Ln=Ce, Pr, Nd, Sm, Eu, Gd, Tb, Dy, Ho, Er, Tm, Yb).

In another aspect of the invention, the sol-gel film is stabilized with ligands operative to stabilize the nanoparticles in an aqueous solution and selected to be substantially removed from the sol-gel matrix during synthesis.

In another aspect of the invention, the lanthanide-doped nanoparticle sol-gel film comprises silica, alumina, zirconia, titania, hafnia, tantalum pentoxide, niobium pentoxide or germanium dioxide.

In another aspect of the lanthanide-doped nanoparticle sol-gel film of one embodiment, the nanoparticle comprises a metal halide salt.

In another aspect of the lanthanide-doped nanoparticle sol-gel film of one embodiment, the nanoparticle comprises a metal fluoride salt.

In another aspect of the lanthanide-doped nanoparticle sol-gel film of one embodiment, the nanoparticle comprises $MF_3$:Ln (M=La, Gd, Lu, Y, Sc; Ln=Ce, Pr, Nd, Sm, Eu, Gd, Tb, Dy, Ho, Er, Tm, Yb).

In another aspect of the lanthanide-doped nanoparticle sol-gel film of one embodiment, the nanoparticle comprises $M^1M^2F_4$:Ln ($M_1$=Li, Na, K, Rb, Cs; $M_2$=La, Gd, Lu, Y, Sc; Ln=Ce, Pr, Nd, Sm, Eu, Gd, Tb, Dy, Ho, Er, Tm, Yb).

In another aspect of the lanthanide-doped nanoparticle sol-gel film of one embodiment, the nanoparticle comprises $MF_2$:Ln (M=Be, Mg, Ca, Sr, Ba; Ln=Ce, Pr, Nd, Sm, Eu, Gd, Tb, Dy, Ho, Er, Tm, Yb).

In another embodiment of the invention, a lanthanide-doped core-shell nanoparticle sol-gel film is provided comprising;
a nanoparticle selected from the group consisting of $LaF_3$:Ln (Ln=Ce, Pr, Nd, Sm, Eu, Gd, Tb, Dy, Ho, Er, Tm, Yb) and a sol-gel matrix comprising silica or alumina.

In another aspect of the invention, the nanoparticle comprises $LaF_3$:Ln (Ln=Er) and the sol-gel film comprises silica.

A method of preparing light emitting sol-gel films made with lanthanide doped nanoparticles, for the production of light is provided. The method comprises, selecting lanthanides for the production of at least one of green, red and blue light when excited with near infrared light, preparing nanoparticles comprising the selected lanthanides, stabilizing the nanoparticles with ligands operative to stabilize the nanoparticles in an aqueous solution and selected to be substantially removed from the sol-gel matrix film during synthesis, incorporating the stabilized nanoparticles into a sol-gel matrix and heating to increase the signal to noise ratio of the luminescence by substantially removing the low molecular weight organic molecules.

In another aspect of the method of preparing light emitting sol-gel films made with lanthanide doped nanoparticles, the ligands are low molecular weight organic molecules.

In another aspect of the method of preparing light emitting sol-gel films made with lanthanide doped nanoparticles, the low molecular weight molecules comprise at least one negatively charged group.

In another aspect of the method of preparing light emitting sol-gel films made with lanthanide doped nanoparticles, the low molecular weight organic molecules are carboxylates.

In another aspect of the method of preparing light emitting sol-gel films made with lanthanide doped nanoparticles, the carboxylate is citrate.

In another aspect of the method of preparing light emitting sol-gel films made with lanthanide doped nanoparticles, the temperature is in the range of 400-1200 C.

In another aspect of the method of preparing light emitting sol-gel films made with lanthanide doped nanoparticles, the temperature is in the range of 600-1200 C.

In another aspect of the method of preparing light emitting sol-gel films made with lanthanide doped nanoparticles, the temperature is approximately 800 C.

In another aspect of the method of preparing light emitting sol-gel films made with lanthanide doped nanoparticles, the invention further comprises spin coating the sol-gel.

In another aspect of the method of preparing light emitting sol-gel films made with lanthanide doped nanoparticles, the sol-gel comprises silica, alumina, zirconia, titania, hafnia, tantalum pentoxide, niobium pentoxide, gadolinium oxide, yttria or germanium dioxide.

In another aspect of the method of preparing light emitting sol-gel films made with lanthanide doped nanoparticles, the sol-gel comprises silica.

In another aspect of the method of preparing light emitting sol-gel films made with lanthanide doped nanoparticles, the sol-gel comprises zirconia.

In another aspect of the method of preparing light emitting sol-gel films made with lanthanide doped nanoparticles, the nanoparticles are selected from the group consisting of $LaF_3$: Ln (Ln=Ce, Pr, Nd, Sm, Eu, Gd, Tb, Dy, Ho, Er, Tm, and Yb).

In another aspect of the method of preparing light emitting sol-gel films made with lanthanide doped nanoparticles, the nanoparticles are selected from the group consisting of $La_{0.75}Yb_{0.2}Ho_{0.05}F_3$, for the production of green and red light, $La_{0.75}Yb_{0.2}Tm_{0.05}F_3$, for the production of blue light, $La_{0.45}Yb_{0.5}Er_{0.05}F_3$ for the production of green and red light.

In another aspect of the method of preparing light emitting sol-gel films made with lanthanide doped nanoparticles, the nanoparticles are selected from the group consisting of $Yb^{3+}$ $Eu^{3+}Er^{3+}Tm^{3+}$ and $La^{3+}$.

In another aspect of the method of preparing light emitting sol-gel films made with lanthanide doped nanoparticles, the nanoparticles are synthesized in a ratio of about 1 $La_{0.45}Yb_{0.5}Er_{0.05}F_3$, to 100 $La_{0.75}Yb_{0.2}Tm_{0.05}F_3$, to 150 $Yb_{0.75}La_{0.2}Eu_{0.05}F_3$.

In another aspect of the method of preparing light emitting sol-gel films made with lanthanide doped nanoparticles, the nanoparticles are core-shell nanoparticles.

In another aspect of the method of preparing light emitting sol-gel films made with lanthanide doped nanoparticles, the shell comprises $LaF_3$.

In one embodiment, a white light emitting lanthanide doped nanoparticle sol-gel film is provided.

In another embodiment, a sol-gel film made with lanthanide doped nanoparticles, the nanoparticles comprising a ratio of about 1 $La_{0.45}Yb_{0.5}Er_{0.05}F_3$, to 100 $La_{0.75}Yb_{0.2}Tm_{0.05}F_3$, to 150 $Yb_{0.75}La_{0.2}Eu_{0.05}F_3$ is provided.

In another embodiment, the lanthanide-doped nanoparticle sol-gel film is stabilized with ligands operative to stabilize the nanoparticles in an aqueous solution and selected to be substantially removed from the sol-gel matrix film during synthesis.

In another aspect of the lanthanide-doped nanoparticle sol-gel film of one embodiment, the ligands are low molecular weight organic molecules.

In another aspect of the lanthanide-doped nanoparticle sol-gel film of one embodiment, the low molecular weight molecules comprise at least one negatively charged group.

In another aspect of the lanthanide-doped nanoparticle sol-gel film of one embodiment, the sol-gel comprises silica, alumina, zirconia, titania, hafnia, tantalum pentoxide, niobium pentoxide, gadolinium oxide, yttria or germanium dioxide.

In another aspect of the lanthanide-doped nanoparticle sol-gel film of one embodiment, the sol-gel comprises silica.

In another aspect of the lanthanide-doped nanoparticle sol-gel film of one embodiment, the sol-gel comprises zirconia.

In another aspect of the lanthanide-doped nanoparticle sol-gel film of one embodiment, the nanoparticle is a core-shell nanoparticle.

In another aspect of the lanthanide-doped nanoparticle sol-gel film of one embodiment, the shell comprises a metal halide salt.

In another aspect of the lanthanide-doped nanoparticle sol-gel film of one embodiment, the shell comprises a metal fluoride salt.

In another aspect of the lanthanide-doped nanoparticle sol-gel film of one embodiment, the shell comprises $MF_3$ (M=La, Gd, Lu, Y, Sc).

In another aspect of the lanthanide-doped nanoparticle sol-gel film of one embodiment, the shell comprises $M^1M^2F_4$ ($M_1$=Li, Na, K, Rb, Cs; $M_2$=La, Gd, Lu, Y, Sc).

In another aspect of the lanthanide-doped nanoparticle sol-gel film of one embodiment, the shell comprises $MF_2$ (M=Be, Mg, Ca, Sr, Ba).

In another aspect of the lanthanide-doped nanoparticle sol-gel film of one embodiment, the shell comprises $LaF_3$.

In another embodiment, a white light emitting lanthanide-doped core-shell nanoparticle is provided. The sol-gel film comprises:
a nanoparticle made from $La_{0.45}Yb_{0.5}Er_{0.5}F_3$, $La_{0.75}Yb_{0.2}Tm_{0.05}F_3$, and $Yb_{0.75}La_{0.2}Eu_{0.05}F_3$; and
a sol-gel matrix comprising silica.

In another aspect of the white light emitting lanthanide-doped core-shell nanoparticle sol-gel film of one embodiment, the sot-gel matrix comprises silica.

In another aspect of the white light emitting lanthanide-doped core-shell nanoparticle sol-gel film of one embodiment, the sot-gel matrix comprises zirconia.

In another embodiment, a method for the production of light is provided. The method comprises:

selecting lanthanides for the production of at least one of green, red and blue light when excited with near infrared light preparing nanoparticles comprising the selected lanthanides;

stabilizing the nanoparticles with ligands operative to stabilize the nanoparticles in an aqueous solution and selected to be substantially removed from the sol-gel matrix film during synthesis;

preparing a sol-gel matrix made with the nanoparticles;

heating the sol-gel matrix to a temperature suitably selected to increase the signal to noise ratio of the luminescence by substantially removing the low molecular weight organic molecules; and exciting the light emitting lanthanide doped nanoparticle sol-gel films with near infrared light.

In another aspect of the method for the production of white light, the infrared light excites $Yb^{3+}$.

In another aspect of the method for the production of white light, the infrared light is 980 nm.

In another aspect of the method for the production of white light, the ligands are low molecular weight organic molecules.

In another aspect of the method for the production of white light, the low molecular weight molecules comprise at least one negatively charged group.

In another aspect of the method for the production of white light, the low molecular weight organic molecules are carboxylates.

In another aspect of the method for the production of white light, the carboxylate is citrate.

In another aspect of the method for the production of white light, the temperature is in the range of 400-1200 C.

In another aspect of the method for the production of white light, the temperature is in the range of 600-1200 C.

In another aspect of the method for the production of white light, the temperature is approximately 800 C.

In another aspect of the method for the production of white light, one embodiment further comprises spin coating said sol-gel.

In another aspect of the method for the production of white light, the sol-gel comprises silica, alumina zirconia, titania, hafnia, tantalum pentoxide, niobium pentoxide, gadolinium oxide, yttria or germanium dioxide.

In another aspect of the method for the production of white light, the sol-gel comprises silica.

In another aspect of the method for the production of white light, the sol-gel comprises zirconia.

In another aspect of the method for the production of white light, the nanoparticles are selected from the group consisting of $LaF_3$:Ln (Ln=Ce, Pr, Nd, Sm, Eu, Gd, Tb, Dy, Ho, Er, Tm, Yb).

In another aspect of the method for the production of white light, the nanoparticles are selected from the group consisting of $La_{0.75}Yb_{0.2}Ho_{0.05}F_3$, for the production of green and red light, $La_{0.75}Yb_{0.2}Tm_{0.5}F_3$, for the production of blue light, $La_{0.45}Yb_{0.5}Er_{0.05}F_3$ for the production of green and red light.

In another aspect of the method for the production of white light, the nanoparticles are selected from the group consisting of $Yb^{3+}Eu^{3+}Er^{3+}Tm^{3+}$ and $La^{3+}$.

In another aspect of the method for the production of white light, the nanoparticles are used in a ratio of about 1 $La_{0.45}Yb_{0.5}Er_{0.05}F_3$, to 100 $La_{0.75}Yb_{0.2}Tm_{0.05}F_3$, to 150 $Yb_{0.75}La_{0.2}Eu_{0.05}F_3$.

In another aspect of the method for the production of white light, the nanoparticles are core-shell nanoparticles.

In another aspect of the method for the production of white light, the shell comprises $LaF_3$.

In another embodiment, white light is emitted.

FIGURES

FIG. 1. $^1$H NMR of $LaF_3$:Er-citrate particles in accordance with the invention. The peaks around 1.2 ppm and 3.6 ppm are due to ethanol and the one around 4.9 ppm arises due to water. δ ($D_2O$): 2.45-2.60 (broad, $\underline{CH_2}COOH$—C$\underline{H}OH(COOH)$—$\underline{CH_2}COOH$).

AFM images were recorded in the contact mode using a Thermo microscope AFM scanner having a silicon nitride tip (model MLCT-EXMT-A) supplied by Veeco Instruments. The particles were dissolved in water and a drop of the solution was put on a mica sheet (5×5 mm$^2$) and allowed to dry before mounting the sheet on the sample holder. The measurements were done with a resolution of 500×500 pixels per image and an image dimension of both 5×5 μm$^2$. The average particle height was determined by measuring the individual particle heights for over 100 particles.

Figure 2A:
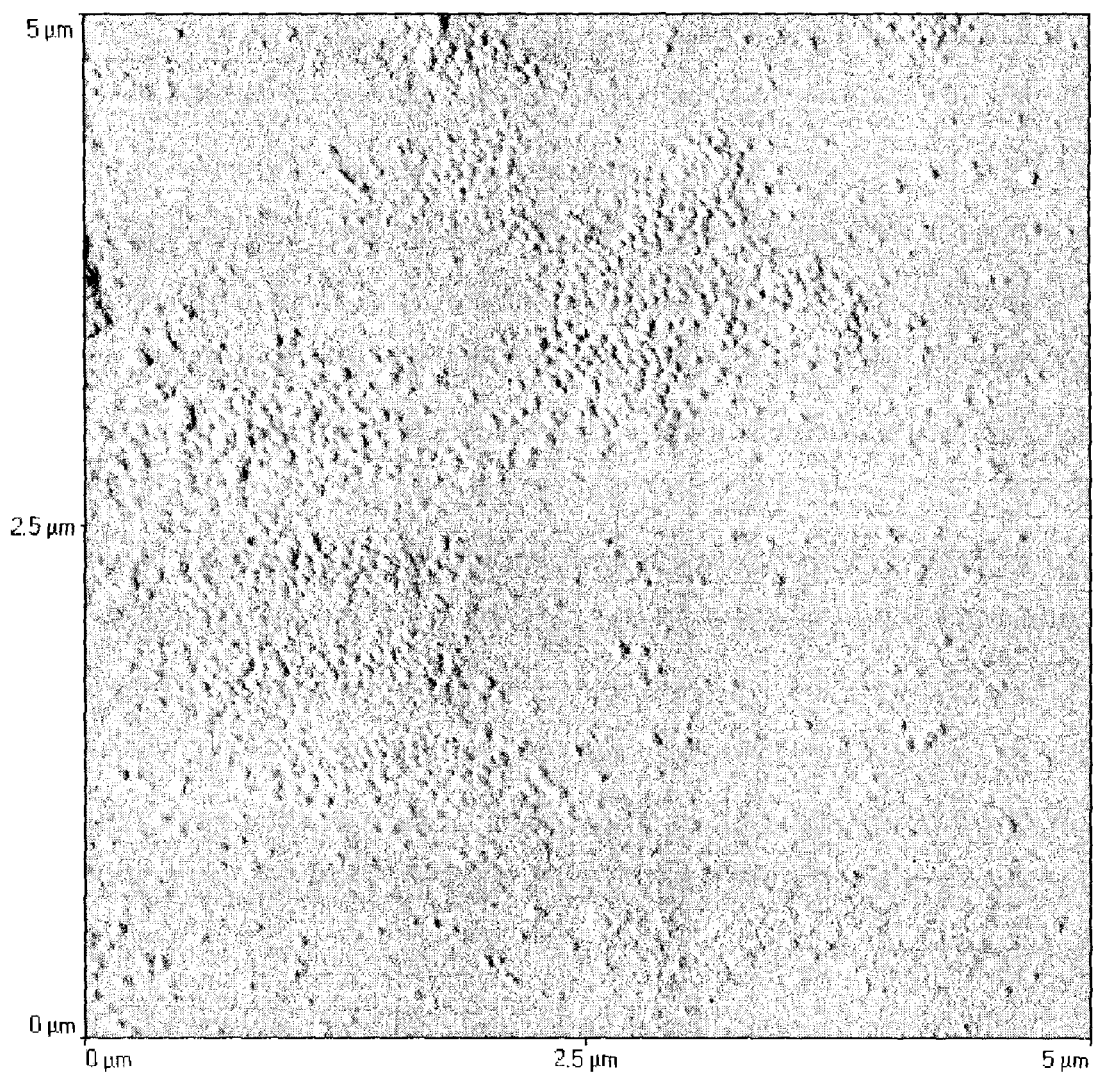
Figure 2B:
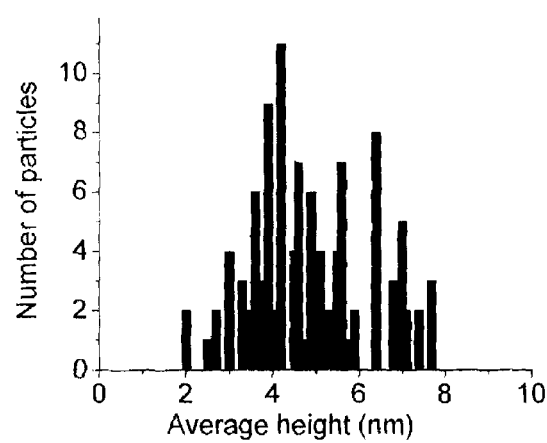

FIGS. 2A-2B. AFM image (FIG. 2A) and histogram (FIG. 2B) of $LaF_3$:Er-citrate particle in accordance with the invention.

Figure 3:
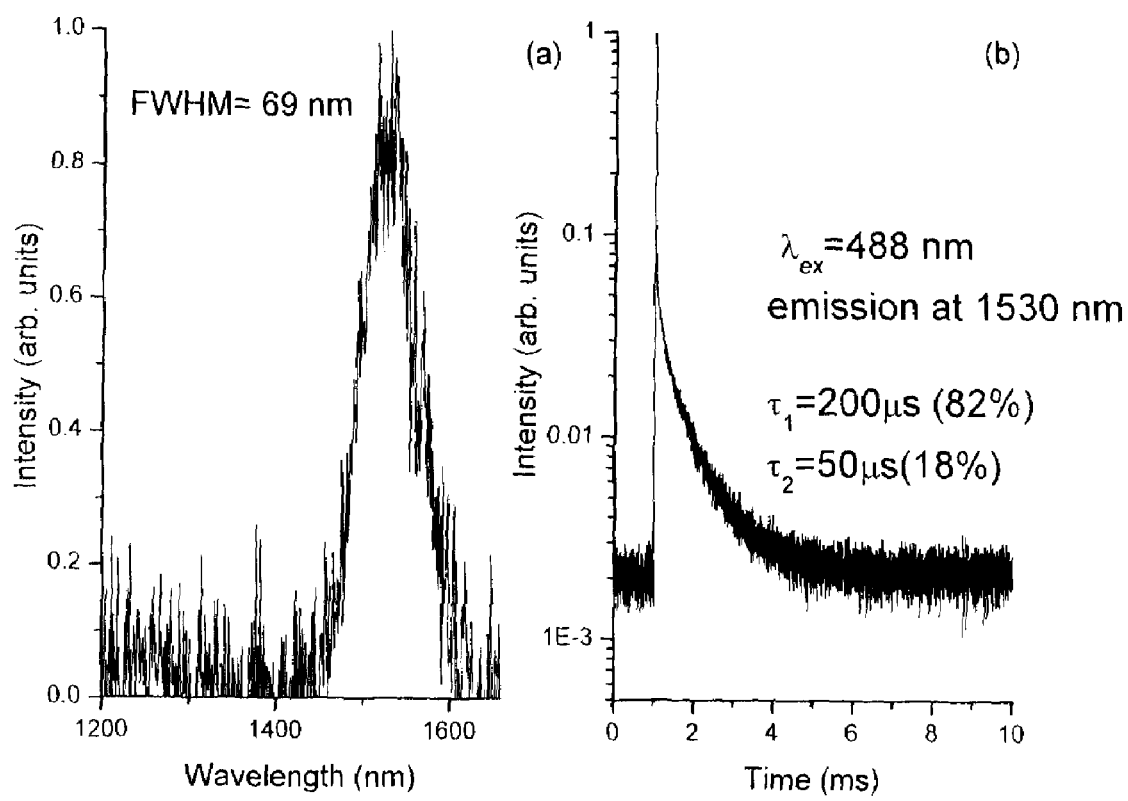

FIG. 3 (a) Emission spectra of $LaF_3$:Er-citrate particles dissolved in $D_2O$ (b) Decay curve corresponding to the $^4I_{13/2}$ level of $Er^{3+}$ in the sample. The sample was excited at 488 nm and the emission monitored at 1530 nm.

Figure 4:
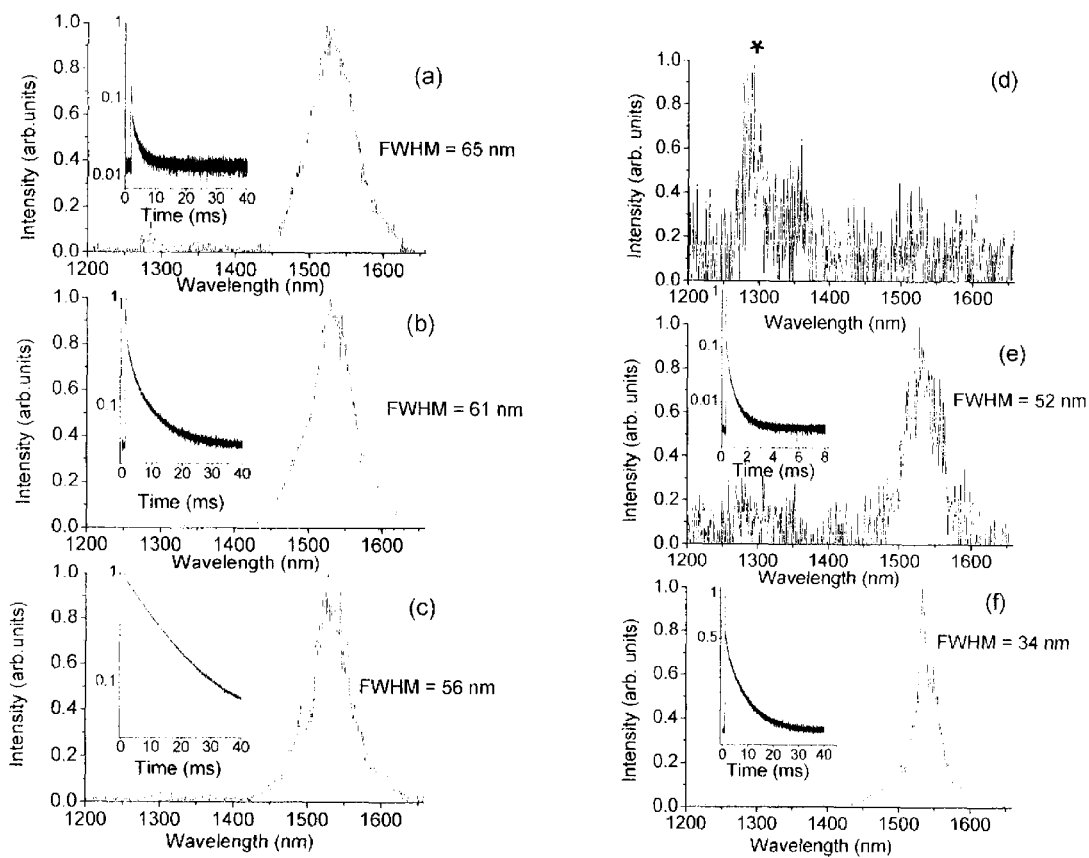

FIG. 4. Emission spectra and decay curves for silica films containing $LaF_3$:Er nanoparticles (left) and bare $Er^{3+}$ ion (right) with Er/Si=1×10$^{-3}$ and heated for 12 h at (a and d) 400, (b and e) 600, and (c and t) 800° C. The samples were excited at 488 nm and emission monitored at 1532 nm. Peak marked "*" is an artifact.

Figure 5:
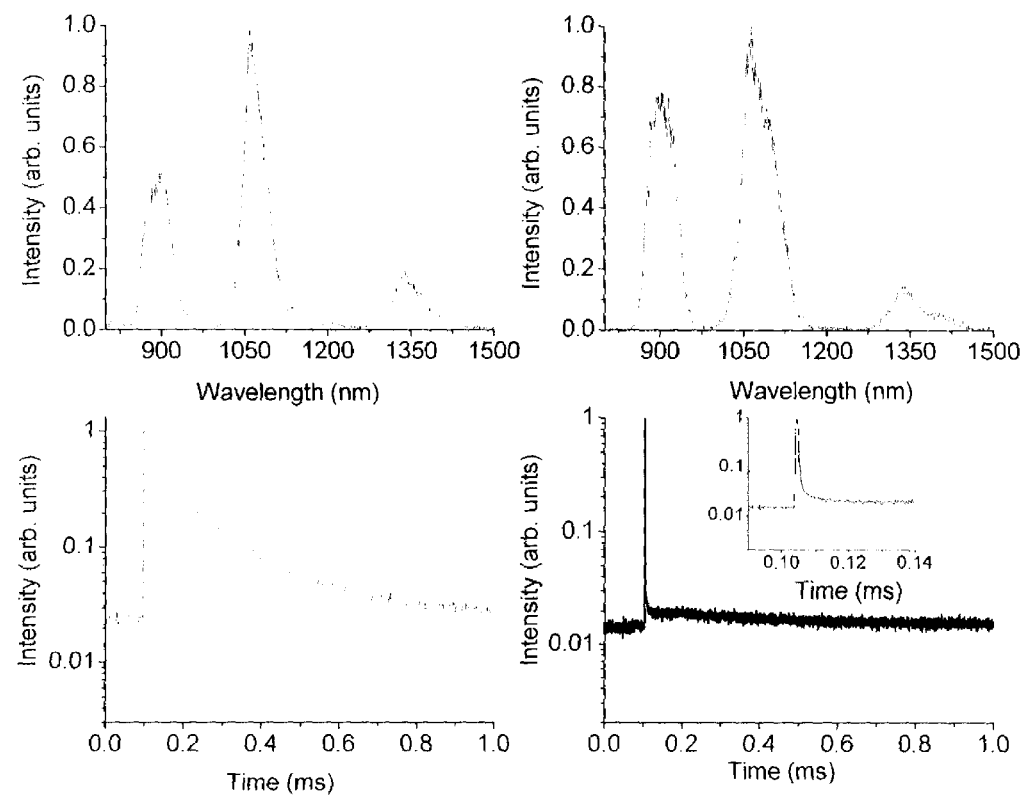

FIG. 5. The emission spectra and decay curves for 800° C. heated (12 h) silica films containing $LaF_3$:Nd nanoparticles (left) and bare $Nd^{3+}$ ions (right), with Nd/Si ratio is 0.9×10$^{-3}$. The samples were excited at 514 nm and emission monitored at 1064 nm. The inset of the decay curve in the right shows an expansion of the fast decay component.

Figure 6:
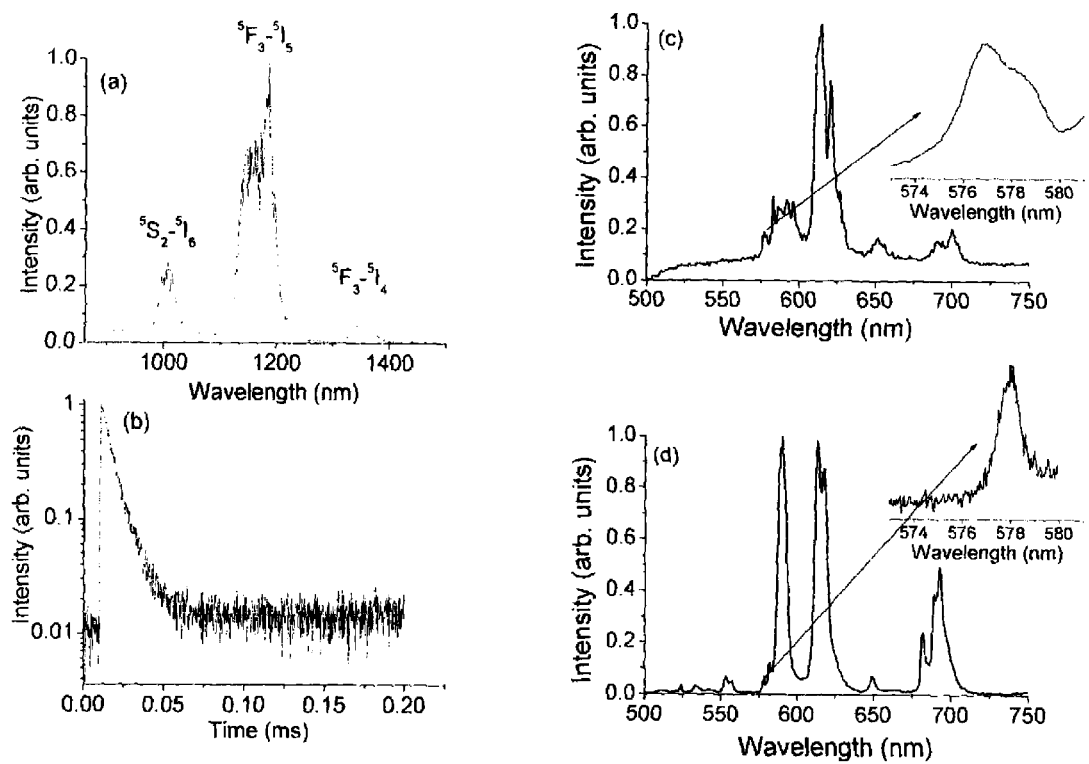

FIG. 6. Emission spectrum and decay curve (left) for silica films containing $LaF_3$:Ho nanoparticles heated in air at 800° C. for 12 h. The samples were excited at 448 nm with emission monitored at 1180 nm. In the right, emission spectrum of $LaF_3$:Eu nanoparticle incorporated silica film heated at 800° C. in air for 12 h, (c), along with that of $LaF_3$:Eu-citrate nanoparticles dissolved in water (d) are shown. (The insets show the emission spectrum collected with a resolution of 0.2 nm in the region corresponding to $^5D_0 \rightarrow ^7F_0$ transition). The samples were excited at 464 nm.

Figure 7:
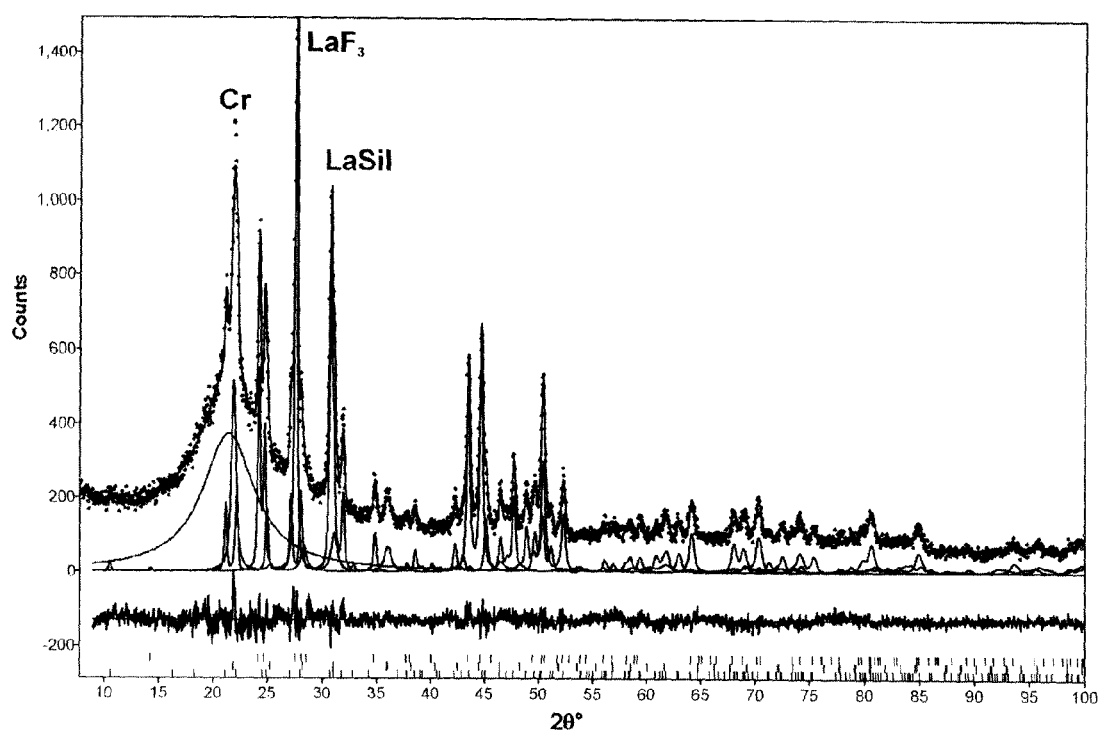

FIG. 7. XRD pattern (Rietveld refinement plot) of a 25 weight % of $LaF_3$:Fu (5%) nanoparticles incorporated silica film heated at 800° C. for 12 h in air. Diamonds—observed pattern, solid line—calculated pattern, solid lines below—calculated patterns of individual phases (selected peaks shown for Cr—cristobalite, $LaF_3$—$LaF_3$ phase, LaSil—$La_{9.31}Si_{6.24}O_{26}$ phase), solid line bottom—difference pattern. The broad peak around 22 degrees is attributed to amorphous silica.

Figure 8:
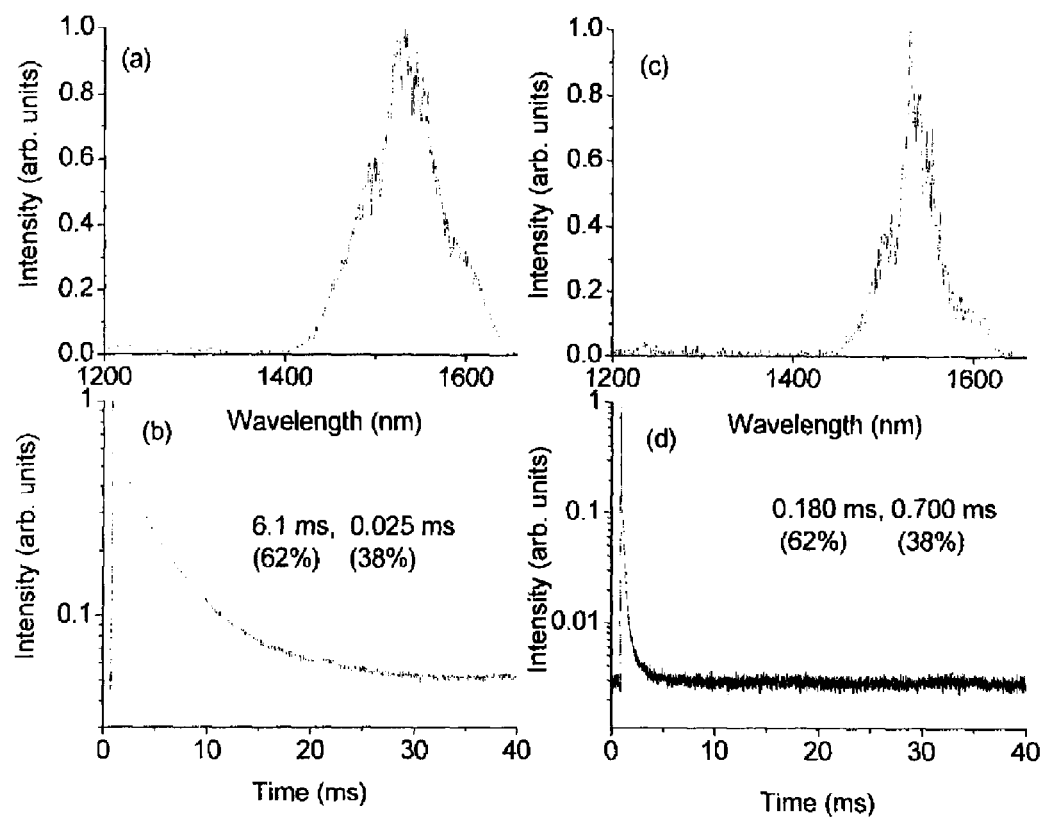

FIG. 8. Emission spectrum (a) and decay curve (b) for $Al_2O_3$ films incorporated with $LaF_3$:Er (5%) nanoparticles and heated at 800° C. in air for 12 h. The emission spectrum and decay curve for $Er^{3+}$ incorporated $Al_2O_3$ films with the same Fr/Al ratio (~$1.5\times10^{-3}$) and subjected to the same heat treatment is shown in FIGS. 5 (*c*) and (*d*) respectively. The samples were excited at 488 nm and the emission, monitored at 1532 nm.

Figure 9:
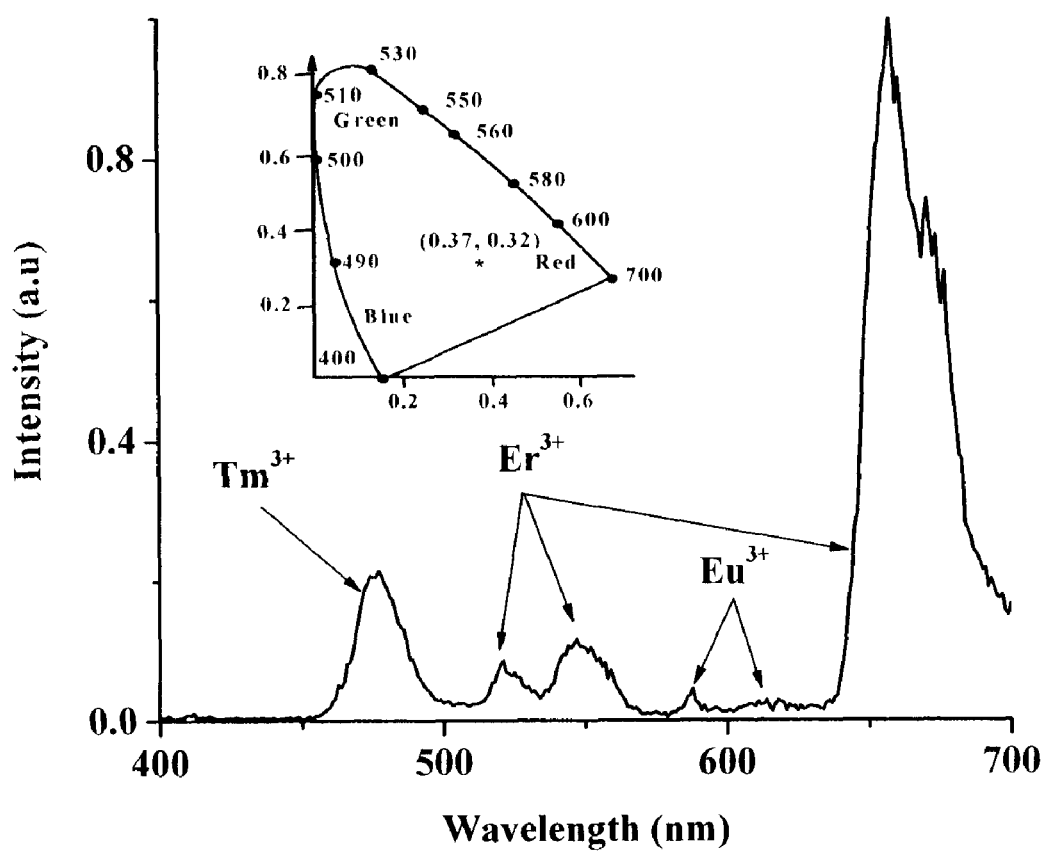

FIG. 9. Up-conversion spectra, after excitation at 980 nm, of a silica film made with $La_{0.45}Yb_{0.5}Er_{0.05}F_3$, $La_{0.75}Yb_{0.2}Tm_{0.2}F_3$, and $Yb_{0.75}La_{0.2}Eu_{0.05}F_3$ nanoparticles, heated at 800° C. (the inset show the CIE colour coordinates of resulting white light) in accordance with the invention.

Figure 10:
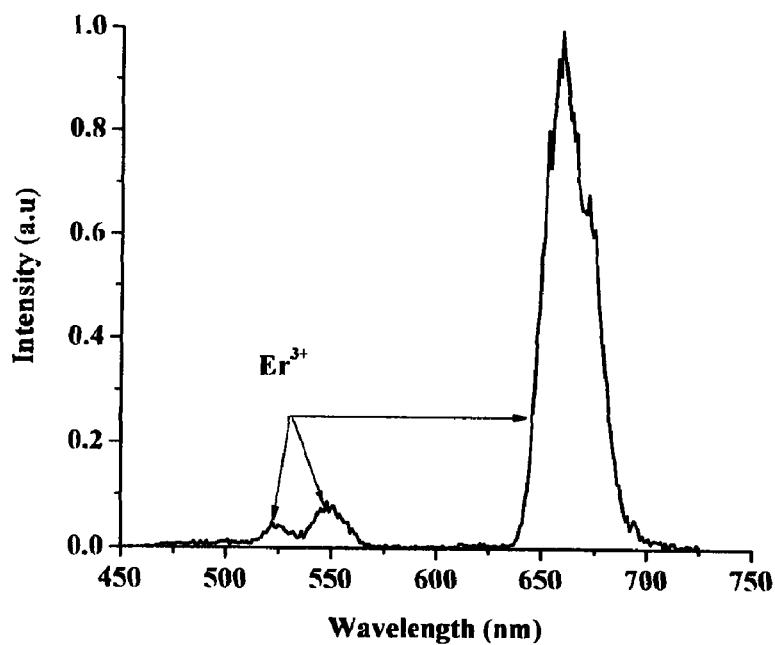

FIG. 10. Up-conversion emission spectra $Ln^{3+}$ ($Er^{3+}$, $Tm^{3+}$ and $Eu^{3+}$) with $Yb^{3+}$ ions directly incorporated in silica film and heated at 800° C. as control sample under 980 nm laser excitation.

Figure 11:
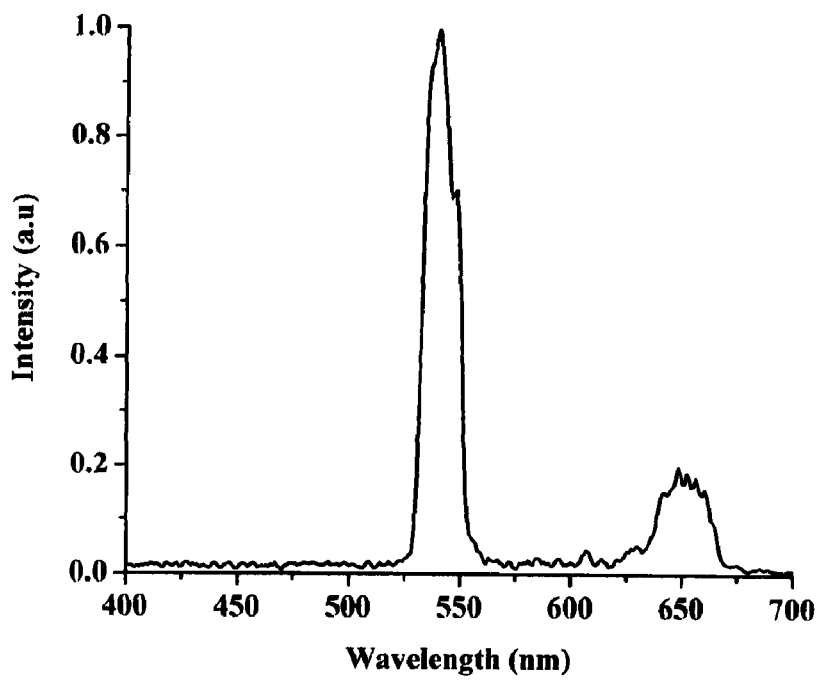

FIG. 11. Up-conversion emission spectra of a silica film made with $La_{0.75}Yb_{0.2}Ho_{0.05}F_3$ nanoparticles (heated at 800° C.) under 980 nm laser excitation.

Figure 12:
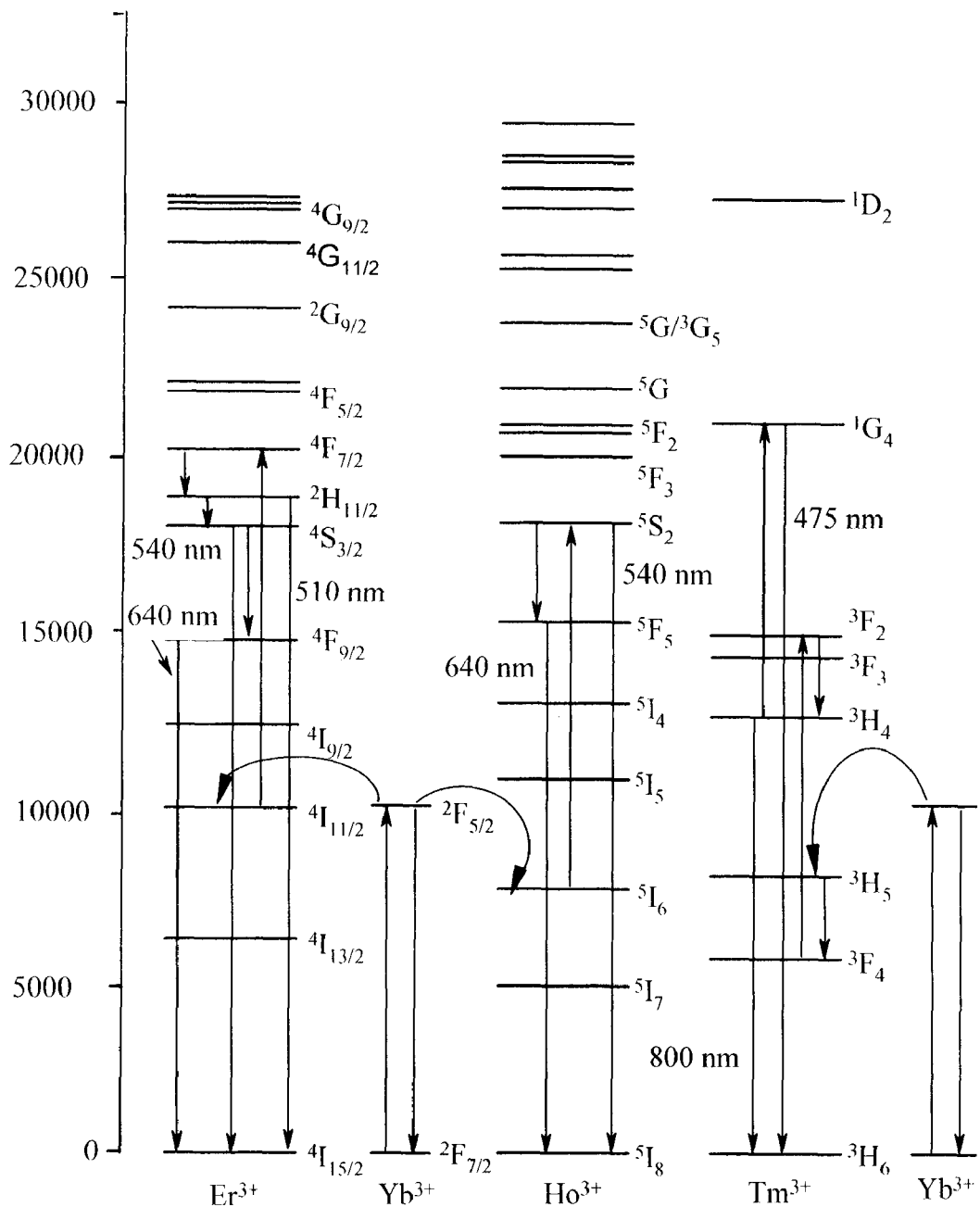

FIG. 12. Energy level of $Ho^{3+}$, $Tm^{3+}$, $Er^{3+}$, and $Yb^{3+}$ ions as well as possible up-conversion mechanisms.

Figure 13:
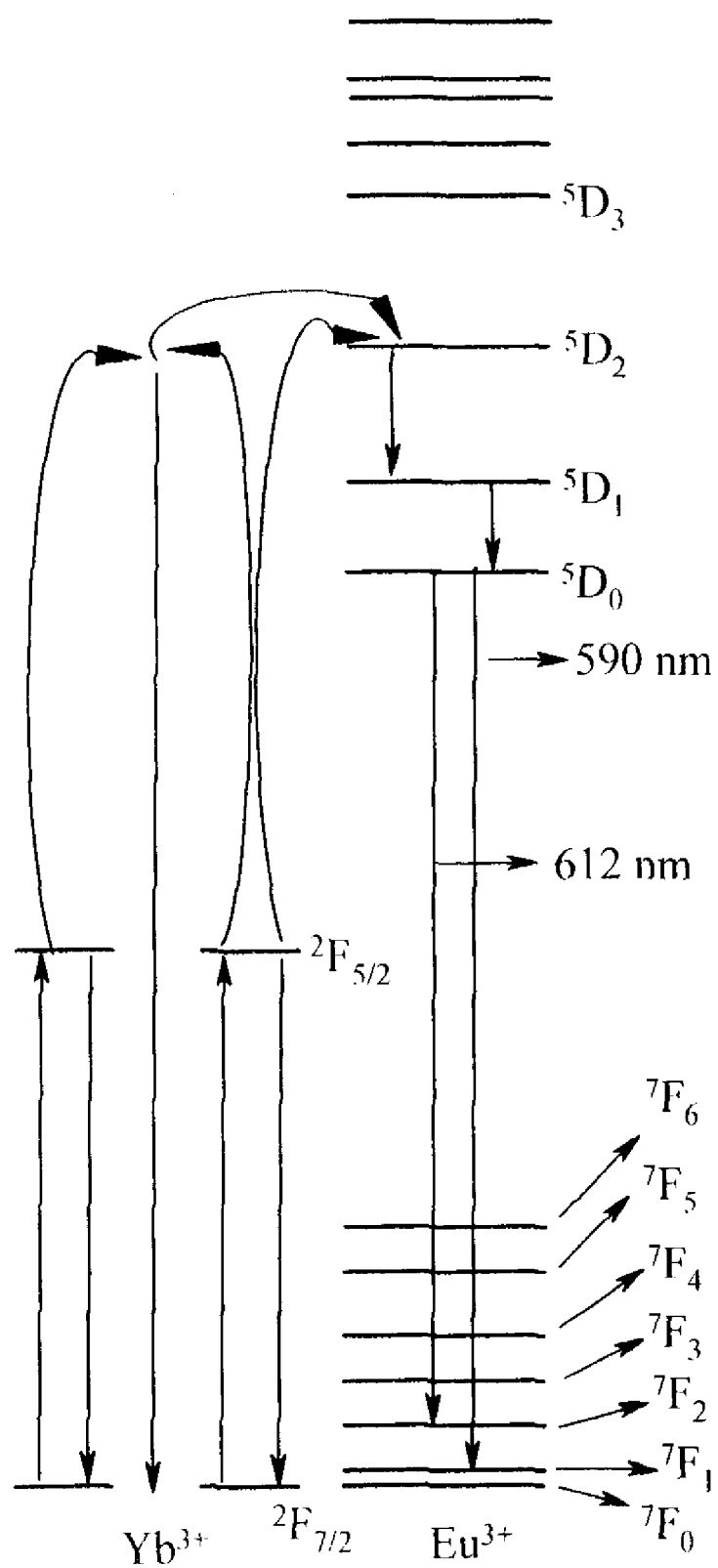

FIG. 13 Energy level of $Eu^{3+}$ and $Yb^{3+}$ ions as well as possible up-conversion mechanisms.

Figure 14:
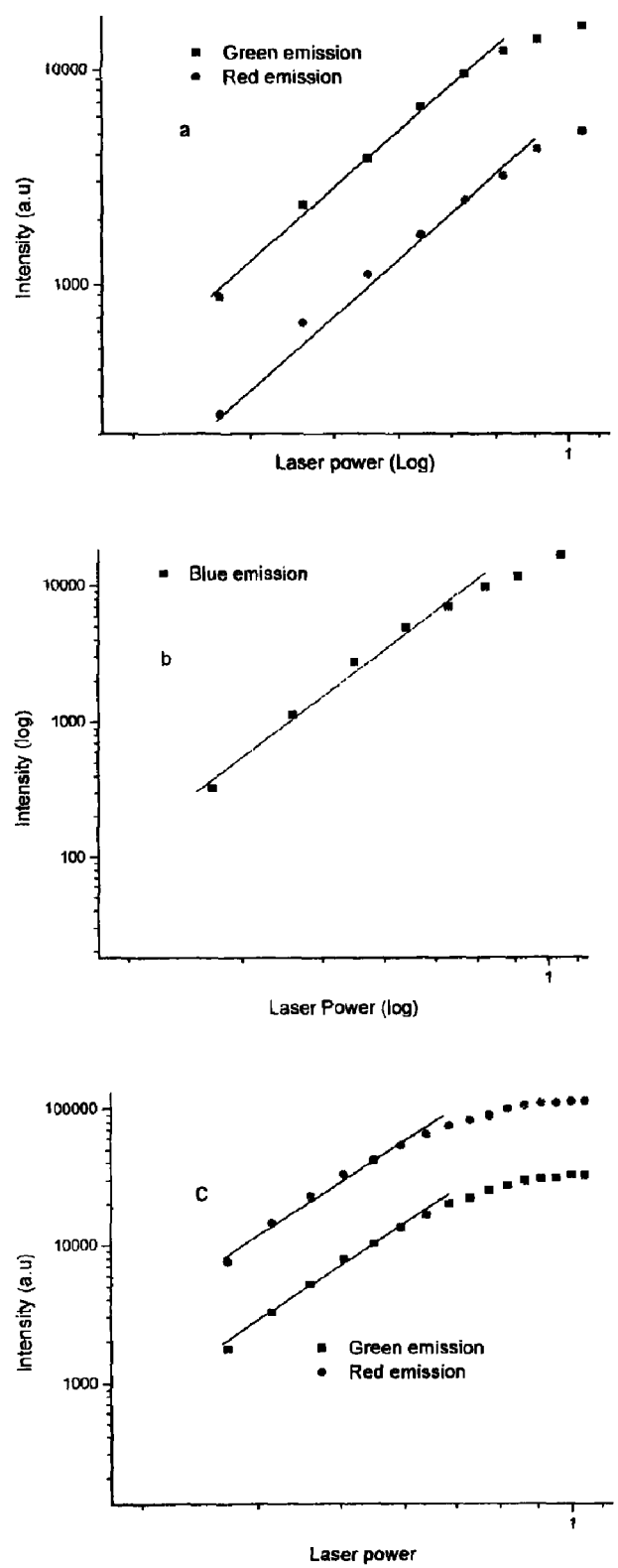

FIG. 14. Dependence of the up-conversion emission intensity on the excitation power in different silica films individually made with a) $La_{0.75}Yb_{0.2}Ho_{0.05}F_3$, b) $La_{0.75}Yb_{0.2}Tm_{0.05}F_3$ and c) $La_{0.45}Yb_{0.5}Er_{0.05}F_3$, heated at 800° C. under 980 nm laser excitation.

Figure 15:
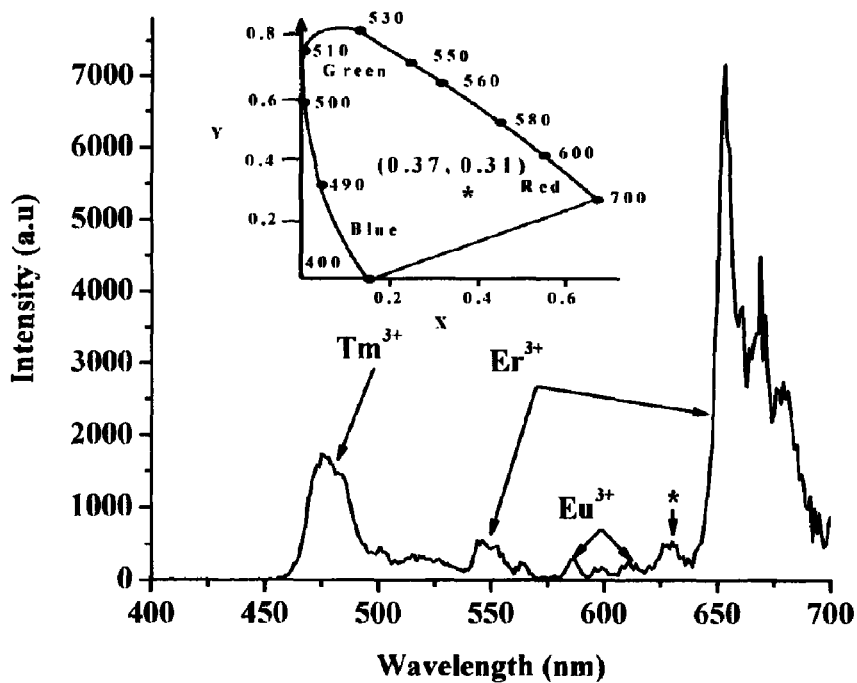

FIG. 15. Up-conversion emission spectra of $ZrO_2$ thin film prepared at 800° C. made with $La_{0.45}Yb_{0.5}Er_{0.05}F_3$, $La_{0.75}Yb_{0.2}Tm_{0.05}F_3$, and $Yb_{0.75}La_{0.2}Eu_{0.05}F_3$ nanoparticles under 300 mW 980 nm CW laser excitation (the insets show the CIE colour coordinates of the resulting white light). * The origin of the emission at 630 nm is not clear.

Figure 16:
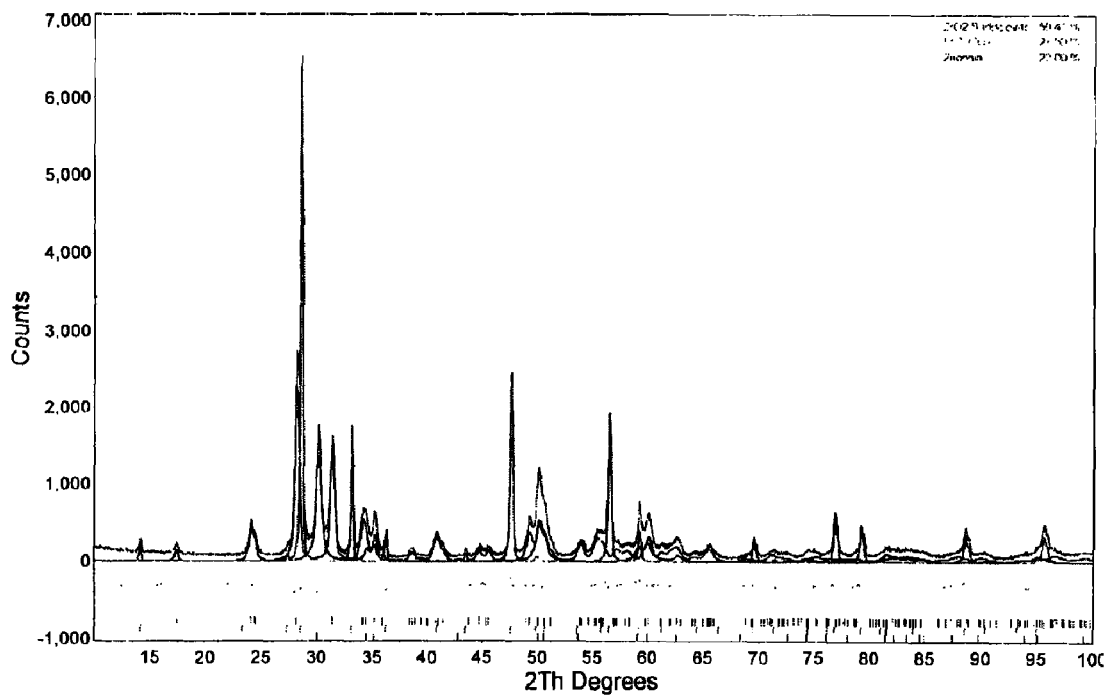

FIG. 16. XRD pattern (Rietveld refinement plot) of a silica film prepared at 800° C. made with 25 weight % of $La_{0.45}Yb_{0.52}Er_{0.05}F_3$ nanoparticles. Green lines: $La_2Zr_2O_7$ phase, Violet lines: $ZrO_2$ Baddeleyite phase, Red lines: $ZrO_2$ Zirconia phase.

Figure 17:

FIG. 17. shows the digital image of bright white light emission from silica thin film made with nanoparticles of combination 1 under 980 nm CW laser excitation.

Figure 18:
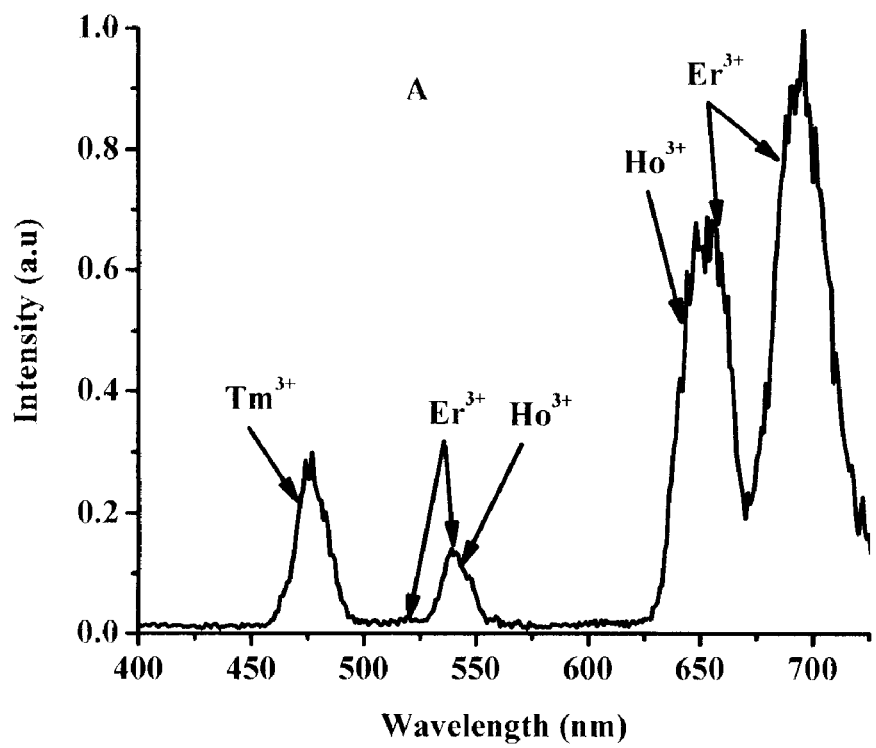
Figure 18:
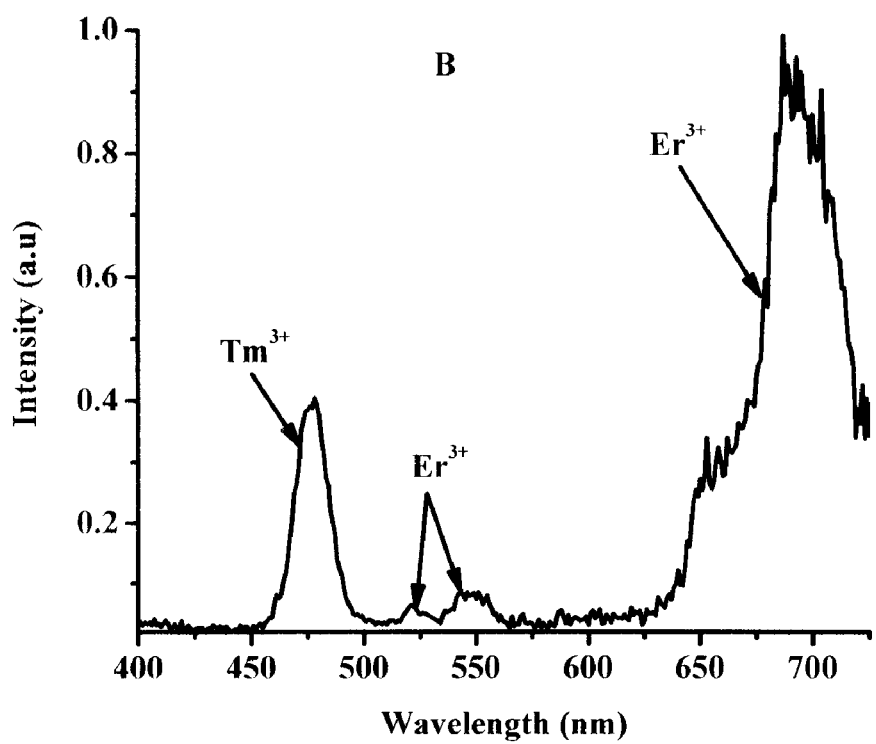

FIG. 18. Up-conversion emission spectra of silica thin film prepared at 800° C. made with nanoparticles of a) combination 1 (Yb/Tm, Yb/Ho and Yb/Er) b) combination 2 nanoparticles (Yb/Tm and Yb/Er) under 300 mW 980 nm CW laser excitation.

Figure 19:
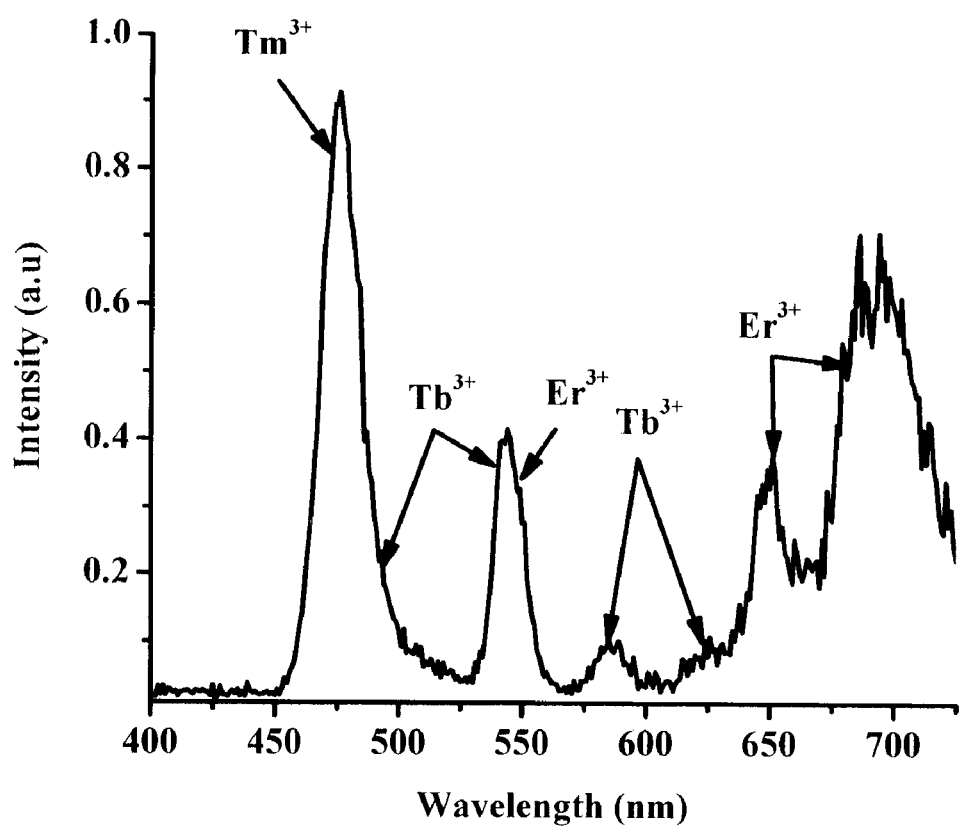

FIG. 19. Up-conversion emission spectra of silica thin film prepared at 800° C. made with nanoparticles of combination 3 (Yb/Tm, Yb/Tb and Yb/Er) under 300 mW 980 nm CW laser excitation.

Figure 20:
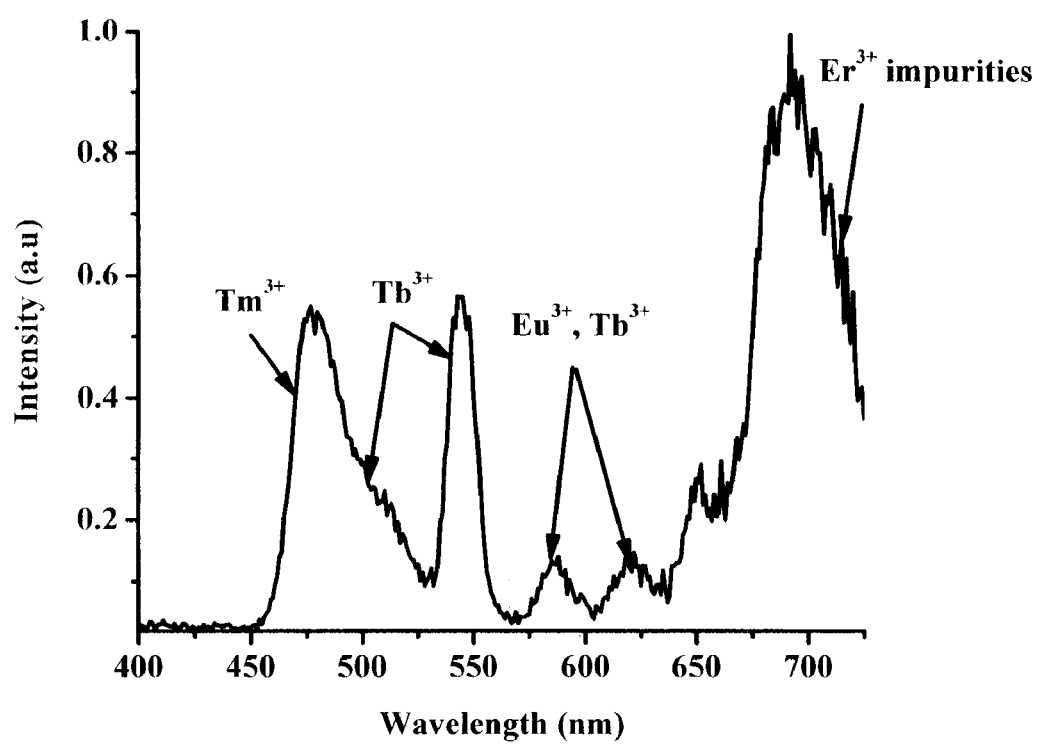

FIG. 20. Up-conversion emission spectra of silica thin film prepared at 800° C. made with nanoparticles of combination 4 (Yb/Tm, Yb/Tb and Yb/Eu) under 300 mW 980 nm CW laser excitation.

Figure 21:
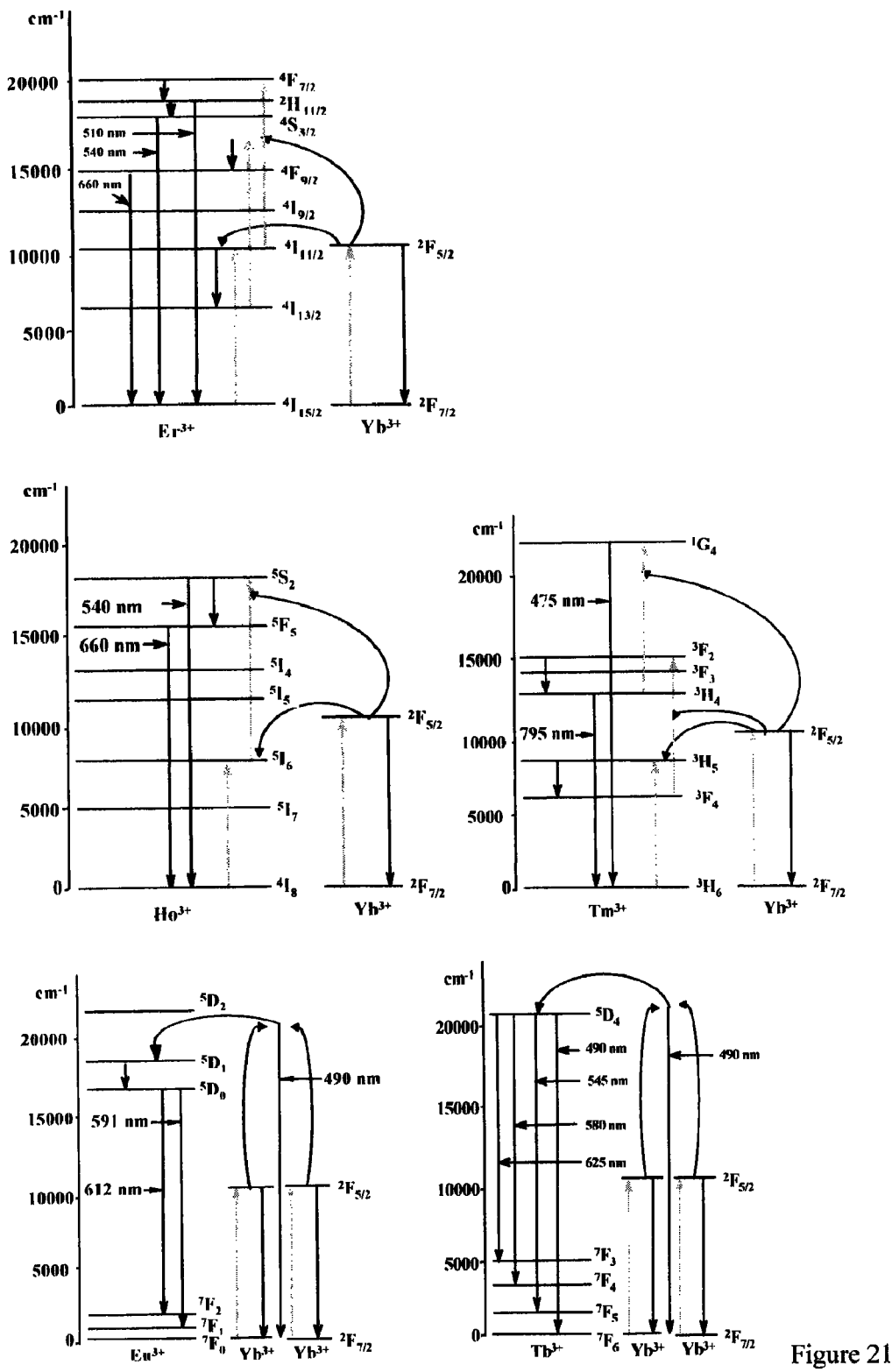

FIG. 21. Energy level of $Ho^{3+}$, $Tm^{3+}$, $Er^{3+}$, $Eu^{3+}$, $Tb^{3+}$ and $Yb^{3+}$ ions as well as the up-conversion mechanisms based on *Phys. Rev. B* 1970, 1, 4208.

Figure 22:
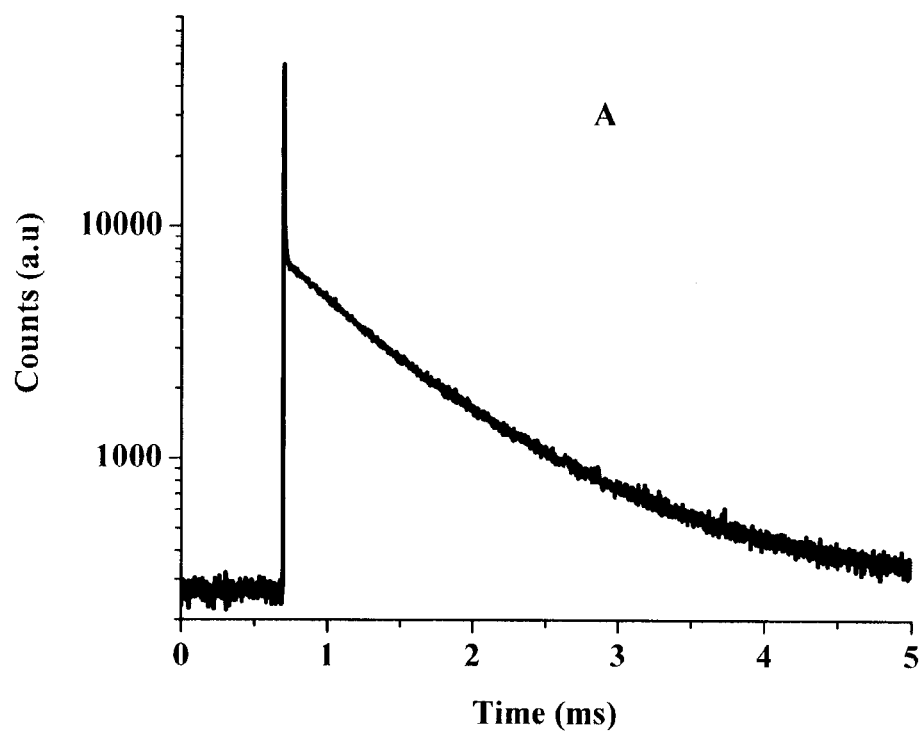
Figure 22:
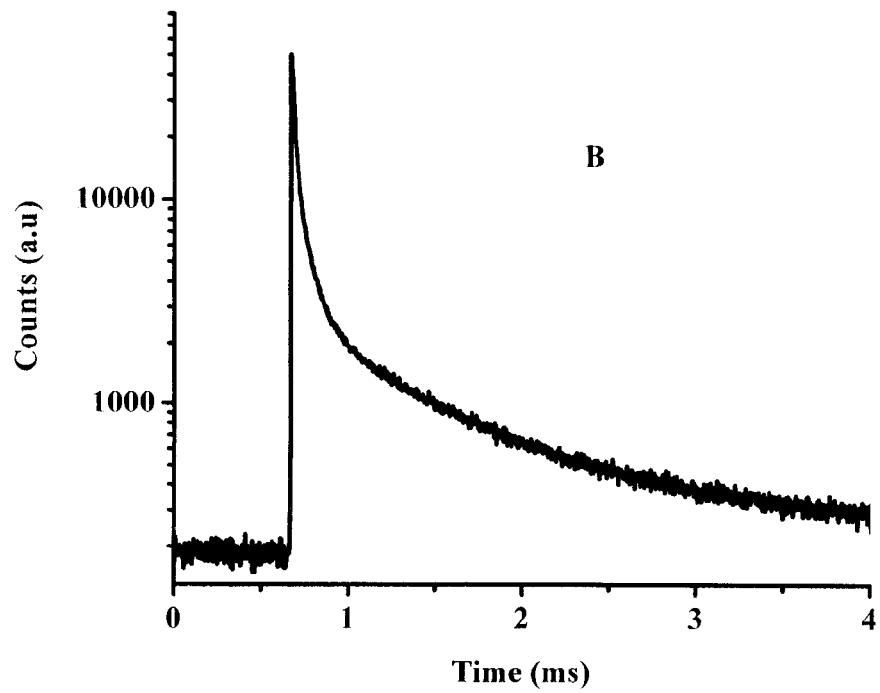

FIG. 22. a) Decay curve for a) $La_{0.45}Yb_{0.5}Y_{0.05}F_3$, b) $La_{0.45}Yb_{0.5}Er_{0.05}F_3$ nanoparticles individually incorporated in silica film and heated at 800° C. ($\lambda_{ex}$=940 nm, $\lambda_{em}$=980 nm, excitation source—OPO)

Figure 23:
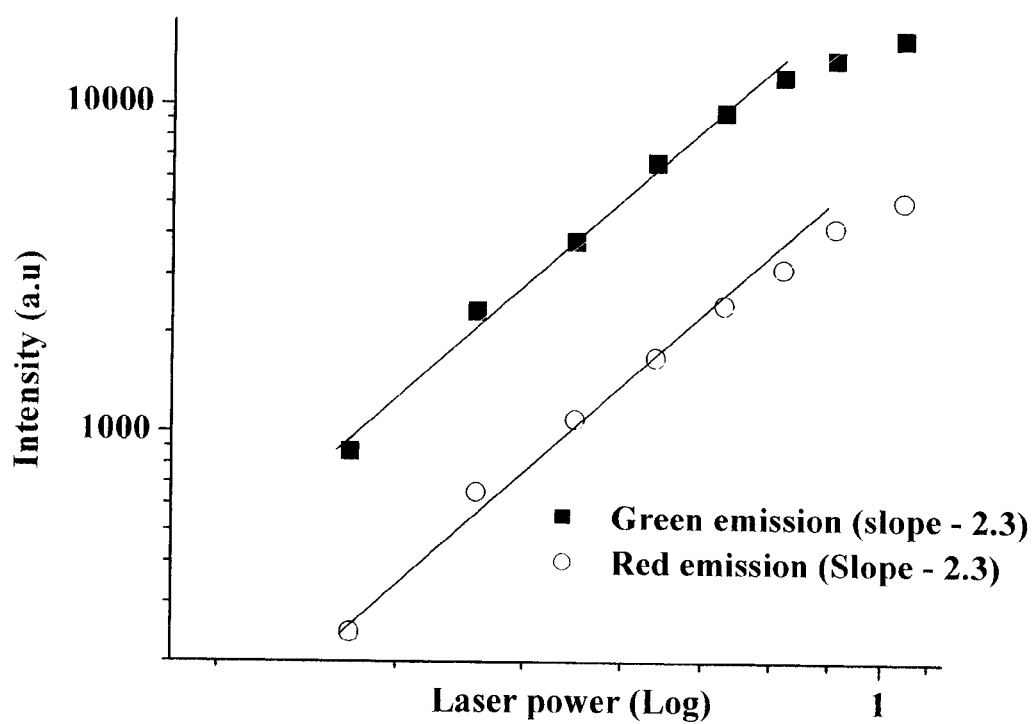

FIG. 23. Dependence of the up-conversion emission intensity on the excitation power in $La_{0.75}Yb_{0.2}Ho_{0.05}F_3$ nanoparticles individually incorporated in silica films and heated at 800° C. under 980 nm laser excitation.

Figure 24:
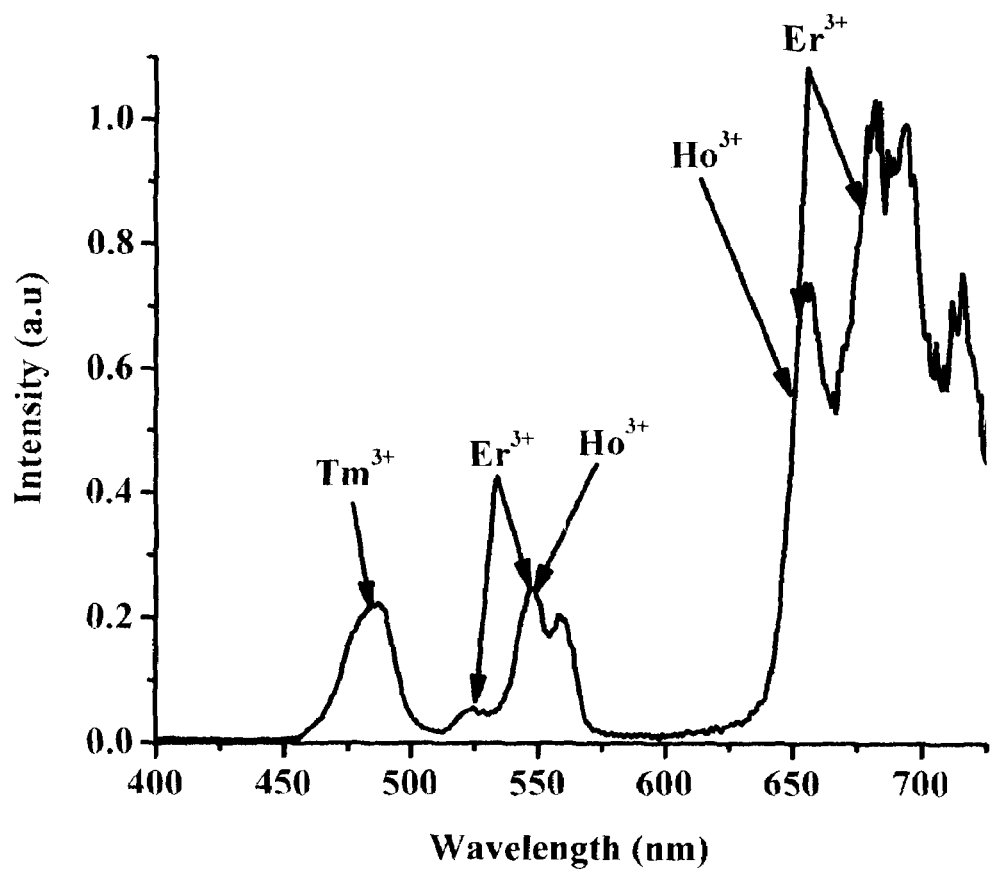

FIG. 24. Up-conversion emission spectra of $ZrO_2$ thin film prepared at 800° C. made with nanoparticles of combination 1 (Yb/Tm, Yb/Ho and Yb/Er) under 300 mW 980 nm CW laser excitation.

Figure 25:
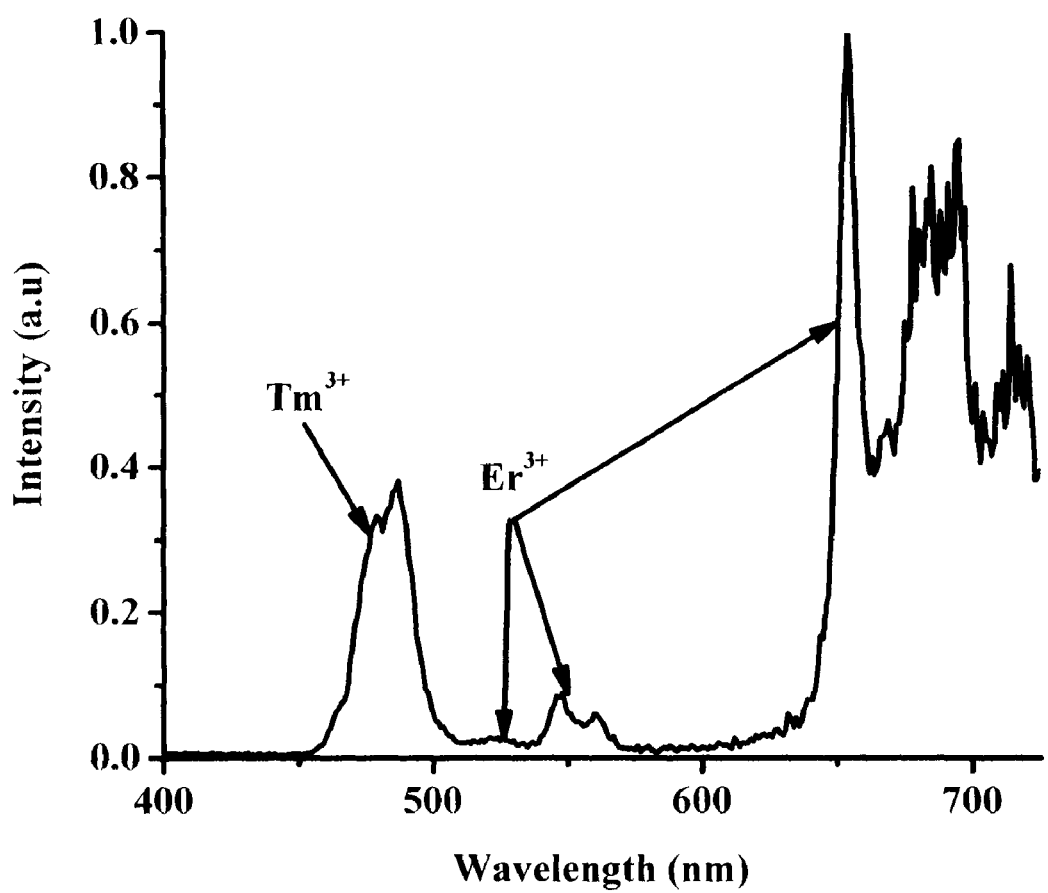

FIG. 25. Up-conversion emission spectra of $ZrO_2$ thin film prepared at 800° C. made with nanoparticles of combination 2 (Yb/Tm and Yb/Er) under 300 mW 980 nm CW laser excitation.

Figure 26:
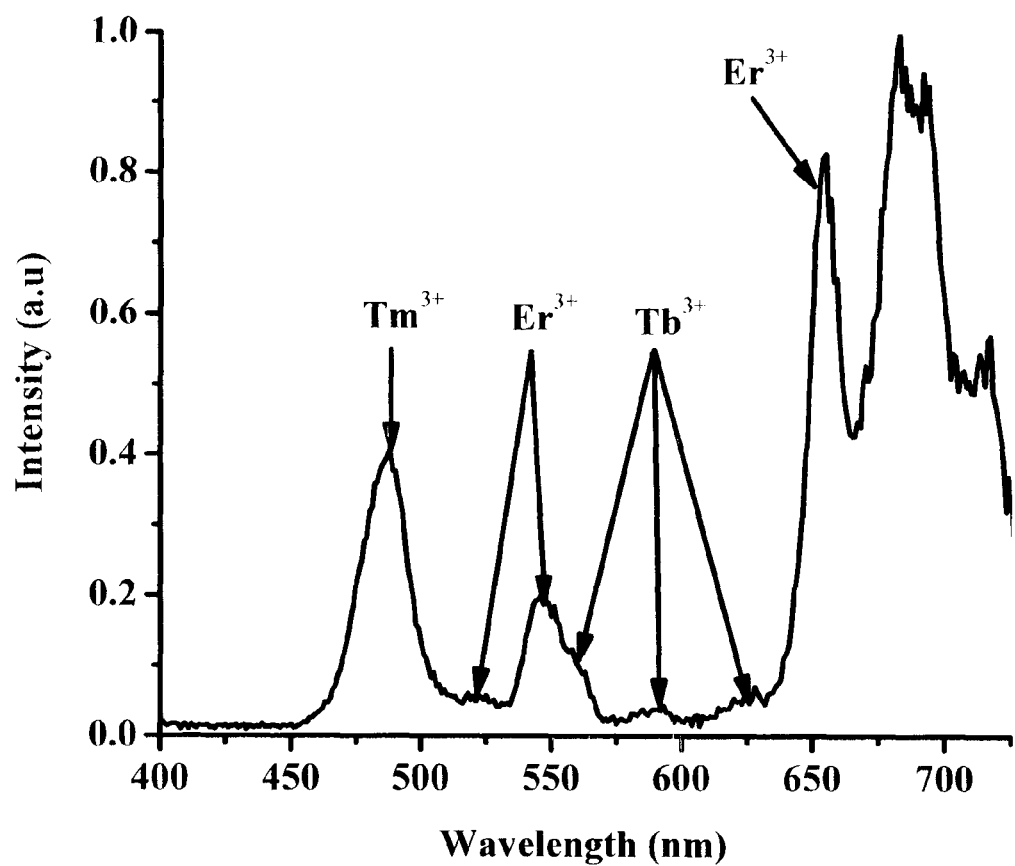

FIG. 26. Up-conversion emission spectra of $ZrO_2$ thin film prepared at 800° C. made with nanoparticles of combination 3 (Yb/Tm, Yb/Tb and Yb/Er) under 300 mW 980 nm CW laser excitation.

DETAILED DESCRIPTION

Definitions

Precursor nanoparticle: A nanoparticle that is used for making doped nanoparticle sol-gel films. The resulting doped nanoparticle sol-gel may or may not be comprised of the precursor nanoparticle.

Product nanoparticle: A doped nanoparticle sol-gel comprises product nanoparticle. The product nanoparticle may or may not comprise precursor nanoparticle. The product nanoparticle can be a core-shell nanoparticle or it may only comprise the core.

Temperature Ranges: The temperature at which the sol-gel films are made range from approximately about 400-1200 C, preferably approximately about 600-1200 C, and more preferably approximately about 800 C.

Example 1

Overview

Silica films with $Ln^{3+}$-doped $LaF_3$ nanoparticles were prepared by the sol-gel method and their luminescent properties were studied as a function of temperature. Significant improvements in the luminescent properties, in terms of the lifetime for the $^4I_{13/2}$ level of $Er^{3+}$ (~10.9 ms), the $^4F_{3/2}$ level of $Nd^{3+}$ (~171 μs) and the $^5F_3$ level of $Ho^{3+}$ (~6 μs) were obtained when corresponding nanoparticles were incorporated in silica films rather than the bare ions. Life time values could be further improved by incorporating core-shell particles (the doped $LaF_3$ core is surrounded by an undoped shell of $LaF_3$) in the silica matrix, as a result of further reduction of the non-radiative pathways.

$LaF_3$:Er (5%) nanoparticles stabilized with citrate ligands were prepared and incorporated in silica films made by the sol-gel method. The luminescent aspects of these films were studied as a function of the annealing temperature from 400 to 800° C. The results were compared with that of silica films doped directly with $Er^{3+}$ ions having the same Er/Si ratio as that of nanoparticle incorporated films. The procedure was extended to other lanthanide ions like $Nd^{3+}$ and $Ho^{3+}$ and also to another sol-gel matrix ($Al_2O_3$), showing the generality of the method.

Preparation of Nanoparticles:

$LaF_3$:Er, $LaF_3$:Eu, $LaF_3$:Nd and $LaF_3$:Ho nanoparticles, (all doped at 5 atom % with respect to the total amount of lanthanide ions), stabilized with citrate ligand were prepared by the co-precipitation technique in aqueous solution in presence of citrate ions. Around 2 g of citric acid and 0.126 g NaF was dissolved in 40 ml of water. The pH of the solution was adjusted to 6 by adding $NH_4OH$ and the solution was heated to 75° C. Stoichiometric amounts of the nitrate salts of lanthanide ions were dissolved in 2 ml water (for $Er^{3+}$ and $Eu^{3+}$ ions) or 2 ml of methanol (for $Nd^{3+}$ and $Ho^{3+}$ ions), and added drop wise. A clear solution was obtained and after two hours of reaction, the resulting solution was mixed with 150 ml of ethanol to precipitate the nanoparticles. These particles were collected by centrifugation, washed with ethanol, and dried under vacuum. Formation of citrate-stabilized nanoparticles was confirmed from $^1H$ NMR and AFM studies (FIGS. 1 and 2). For the preparation of core-shell nanoparticles having a doped core covered by an undoped shell, the procedure was slightly modified.

Preparation of Core-Shell Nanoparticles:

Approximately 3 g of citric acid was dissolved in 35 ml of water and neutralized with $NH_4OH$ till the pH reaches around 6 and this solution was then heated to 75° C. $La(NO_3)_3 \cdot 6H_2O$ and $Nd(NO_3)_3 \cdot 6H_2O$ or $Ho(NO_3)_3 \cdot 5H_2O$ (1.33 mmol total) were dissolved in 3 ml of methanol and added to this followed by the dropwise addition of 3 ml water containing 0.266 g NaF. After 10 minutes, 3 ml of a methanolic solution containing 0.6 g of $La(NO_3)_3 \cdot 6H_2O$ was added drop-wise to the reaction mixture while stirring, for the formation of shell around the core particles. The reaction was allowed to continue for two hours and finally the nanoparticles were precipitated by the addition of excess of ethanol to the reaction mixture.

Formation of particles having a core-shell geometry by this procedure was confirmed from the luminescent studies of citrate stabilized $LaF_3$:Eu—$LaF_3$ core-shell nanoparticles, prepared by the same procedure. The details of the luminescent properties of core shell particles have been reported elsewhere (J. W. Stouwdam and F. C. J. M. van Veggel, Langmuir 20, 11763 (2004)).

Approximately 50-60 mg of these nanoparticles was dissolved in 1.5 ml water, which was then mixed with 3 ml of tetraethoxysilane (TEOS) and 7.8 ml of ethanol. The pH of the solution was adjusted to 2 by adding few drops of 0.1 N HCl and the solution was stirred for 24 hours to get a clear sol. The sol was then spin coated on a quartz substrate at 2500 rpm and heated at different temperatures under ambient environment. The films were transparent to visible light and no cracks were observed.

Emission spectra and decay curves from the samples were measured using a pulsed Nd—YAG (Nd—YAG stands for $Nd^{3+}$ doped yttrium aluminium garnet) laser source attached with an optical parametric oscillator (OPO). The pulse duration was 5 ns with a repetition frequency of 10 Hz. Emission spectrum of $LaF_3$:Er nanoparticles dispersed in $D_2O$ obtained after exciting the sample at 488 nm, was characterized by a broad peak around 1530 nm (full width at half maximum (FWHM)=69 nm), corresponding to the $^4I_{13/2} \rightarrow ^4I_{15/2}$ transition. The decay curve corresponding to the $^4I_{13/2}$ level in the sample was fitted bi-exponentially with decay times 200 μs (82%) and 58 μs (18%) respectively (FIG. 3).

FIG. 4 shows the emission spectra and decay curves for the $LaF_3$:Er and $Er^{3+}$ incorporated silica films with Er/Si ratio $\sim 1.0 \times 10^{-3}$ and heated in air at 400, 600, and 800° C. for 12 hours. There was significantly improved signal to noise ratio in the emission spectrum for the particles incorporated films heated at all the temperatures. Furthermore, the full width at half maximum (FWHM) for particle-incorporated films were almost comparable for all the heat treatment temperatures. However, for silica films directly incorporated with $Er^{3+}$ ions, the signal to noise ratio was poor, particularly for low temperature heat-treated films. The line width drastically decreased with increased heat treatment temperatures. The lifetime values corresponding to the $^4I_{13/2}$ level of $Er^{3+}$ from the 800° C. heated samples are shown in Table 1. (Corresponding values for the low temperature heated films are shown in Table 2). For silica films incorporated with $LaF_3$:Er nanoparticles, life time values were much higher at all the heat treatment temperatures compared to the directly $Er^{3+}$ incorporated silica films, as can be seen from FIG. 4 and Table 1. For nanoparticle incorporated films heated at 800° C., the $^4I_{13/2}$ life time was found to be 10.9 ms. In the case of silica film incorporated with bare $Er^{3+}$ ions and heated at 800° C., there was a fast decay component followed by a slow decay component. The observed fast decay component for the 800° C. heated film was attributed to the aggregation of $Er^{3+}$ ions in the silica matrix. However, for silica films incorporated with $LaF_3$:Er nanoparticles, no fast decay component was observed particularly for the ones heated at 600 and 800° C. Thus, the particle-incorporated silica films offer a clear advantage in terms of the improved lifetime and absence of clustering of lanthanide ions when compared with silica films directly incorporated with the bare $Er^{3+}$ ion.

Similar experiments were carried out for $Nd^{3+}$- and $Ho^{3+}$-incorporated samples. The citrate-stabilized nanoparticles of $LaF_3$:Nd and $LaF_3$:Ho were incorporated in a silica matrix by the same procedure employed for the $LaF_3$:Er nanoparticles. FIG. 5 shows the emission spectra and corresponding decay curves for silica films incorporated with $LaF_3$:Nd nanoparticle and $Nd^{3+}$ ion, respectively, with a Nd/Si ratio $0.9 \times 10^{-3}$ and heated at 800° C. for 12 h. For silica films doped with $LaF_3$:Nd nanoparticles, decay corresponding to $^4F_{3/2}$ level was multi-exponential with a major component of ~171 μs (72%) and a faster component of 56 μs (28%). For $Nd^{3+}$ ions directly doped in silica films with the same Nd/Si ratio, the corresponding decay curve was characterized by a fast decay component (~2.0 μs, 48%) as can be seen from the inset of FIG. 5 (bottom right), and a slow decay component (130 μs, 52%). The fast component is attributed to the clusters of $Nd^{3+}$ ions formed in the silica matrix.[35] A comparison of the life time values shown in Table 1 and the decay curves shown in FIG. 5 clearly reveals that there is an improvement of the luminescent properties, in terms of improved life time and absence of lanthanide ion clustering, when the nanoparticles are incorporated in the silica films rather than the bare ions.

For silica films incorporated with $LaF_3$:Ho nanoparticles with a Ho/Si ratio around $1.5 \times 10^{-3}$ and heated at 800° C., luminescence was observed both in the visible and near-infrared region. The emission spectrum in the NIR region along with the decay curve corresponding to the $^5F_3$ level of $Ho^{3+}$ from this sample are shown in FIG. 6 (left). The lifetime value of $^5F_3$ level was found to be 6 μs (75%) and 12 μs (25%), with no faster decay component, indicating the absence of $Ho^{3+}$ clustering in the sample. In contrast to this, when $Ho^{3+}$ ions are directly doped in silica films with the same Ho/Si ratio, no emission was observed in the visible and near-infrared region.

$LaF_3$:Eu nanoparticle stabilized with citrate ions were prepared, incorporated in silica matrix and subjected to heat treatments at different temperatures. FIG. 6 (right) show the emission spectra of the $LaF_3$:Eu incorporated silica film heated at 800° C. in air. The intensity of the $^5D_0 \rightarrow ^7F_2$ emission peak (~615 nm) for this sample was found to be significantly larger than that of the $^5D_0 \rightarrow ^7F_1$ emission peak (591 nm), which is characteristic of $Eu^{3+}$ surrounded by oxygen ions. As both $^5D_0$ and $^7F_0$ levels are non-degenerate, the transition between the levels can be used as a probe to understand the environment around the $Eu^{3+}$ ions in the lattice. The high resolution emission spectrum corresponding to the $^5D_0 \rightarrow ^7F_0$ transition for $LaF_3$:Eu nanoparticles incorporated silica films (shown as inset of FIG. 6c) clearly shows an asymmetric peak which could be deconvoluted into two Gaussians centered around 576.9 and 578.2 nm, respectively, indicating that more than one type of $Eu^{3+}$ is present in the films. For $LaF_3$:Eu nanoparticles relatively sharper and a more symmetric peak around 578 nm was observed corresponding to the $^5D_0$-$^7F_0$ transition (inset of FIG. 6d). Comparing the spectra in FIGS. 6(c and d), it is clear that $Eu^{3+}$ is existing in more than one crystallographic phase in $LaF_3$:Eu incorporated silica films. X-ray diffraction studies carried out on a sample of silica film incorporated with 25 wt % of $LaF_3$:Eu nanoparticles and heated at 800° C., revealed the presence of a non-stoichiometric lanthanum silicate phase, $(La_{9.31}Si_{6.24}O_{26})$, along with the $LaF_3$ phase as can be seen from FIG. 7, roughly in a 1:1 ratio. The $Eu^{3+}$ thus occurs in two different phases, which confirmed the luminescence data. It is likely that the surface of the $LaF_3$:Eu nanoparticles reacted with the silanol groups of the matrix to form the $Eu^{3+}$-doped lanthanum silicate surrounding a core of unreacted $LaF_3$:Eu. One skilled in the art would conclude that the same occurs for all $LaF_3$:Ln (Ln—Er, Nd, and Ho) doped $SiO_2$ films in this study. The life time values of the lanthanide ion containing silica films can be further improved by incorporating the core-shelf nanoparticles having a doped core covered by an undoped shell. (Core-shell nanoparticles doped with $Er^{3+}$ ions in the core were found to be less soluble in water and hence good quality sol-gel films could not be obtained). The life time values observed for $^4F_{3/2}$ level of $Nd^{3+}$ and $^5F_3$ level of $Ho^{3+}$ in $LaF_3$:Nd—$LaF_3$ and $LaF_3$:Ho—$LaF_3$ core-shell nanoparticle incorporated films are shown in Table 1. There was an improvement in the life time of the core-shell particles incorporated films compared to the core particle incorporated films.

Incorporation of Nanoparticles in $Al_2O_3$ Matrix:

In order to further substantiate the generality of the method, the above experiments were repeated by taking $Al_2O_3$ as the sol-gel matrix. $Al_2O_3$ sols were prepared based on the procedure similar to that of Ishizaka et al.[36] Hydrous aluminum hydroxide was precipitated by adding aqueous 6M $NH_3$ solution to a 0.2 M $Al(NO_3)_3.9H_2O$ solution drop wise under stirring. The precipitated hydroxide was aged for 12 h without stirring, then centrifuged and washed with water. This was then mixed with glacial acetic acid and heated at 80° C. for 8 h. The viscous sol obtained thus was mixed with around 3.5 mg of $Er(NO_3)_3.5H_2O$ or around 30 mg $LaF_3$:Er nanoparticles stabilized with citrate ligand and stirred for 24. The sot was then transferred to a Petri dish and dried under ambient conditions followed by heating at 800° C. for 8 hours.

Similar to $SiO_2$ matrix, significant improvement in the life time values were observed when $LaF_3$:Er nanoparticles were incorporated in the films compared to the bare $Er^{3+}$ incorporated films (FIG. 8).

In conclusion, a general method, from readily available and cheap starting materials, that combines the advantages of both nanoparticles and the sol-gel method, has been demonstrated for making silica and alumina films containing highly luminescent lanthanide ions. The improved luminescent properties of nanoparticle incorporated films have been attributed to the effective isolation of lanthanide ions from the high phonon energy matrix, residual OH groups, and absence of lanthanide ion clustering.

Example 2

Overview

White light was generated from a silica or zirconia thin film made with $Yb_{0.75}La_{0.2}Eu_{0.05}F_3$, $La_{0.45}Yb_{0.5}Er_{0.05}F_3$, and $La_{0.75}Yb_{0.2}Tm_{0.05}F_3$ nanoparticles by exciting with a single source near infrared light (980 nm CW diode laser). $Eu^{3+}$ and $Tm^{3+}$ ions are responsible for red and blue emission respectively. $Er^{3+}$ ion is responsible for green as well as red emission. The Commission Internationale de l'Eclairage (CIE) coordinates of the resulting light were easily adjusted by controlling the concentration of lanthanide ions in the nanoparticles[27-31] as well as the concentration of nanoparticles ($Ln^{3+}$ doped) in the sol-gel thin layer.

More specifically, there is spatial isolation of the three pairs of precursor $Ln^{3+}$ ions (i.e. $Tm^{3+}$/$Yb^{3+}$, $Er^{3+}$/$Yb^{3+}$, and $Eu^{3+}$/$Yb^{3+}$) that generate blue, green plus red, and red emission, respectively.

Silica thin film made with $La_{0.75}Yb_{0.2}Ho_{0.05}F_3$ nanoparticles produced bright green light by exciting with near infrared light (980 nm CW diode laser) which can be also used in the generation of white light.

In the case of $ZrO_2$ as the sol-gel matrix we see $La_2Zr_2O_7$ as phase, which is a low-phonon matrix. This has the advantage of leading to less quenching than would occur in high-phonon matrices.

Synthesis of Citrate Stabilized Lanthanide Doped Nanoparticles $La_{0.45}Yb_{0.5}Er_{0.05}F_3$, $La_{0.75}Yb_{0.2}Tm_{0.05}F_3$, $La_{0.75}Yb_{0.2}Ho_{0.05}F_3$, and $Yb_{0.75}La_{0.2}Eu_{0.05}F_3$ nanoparticles, stabilized with citrate ligand were prepared by the co-precipitation technique in aqueous solution in presence of citrate ions. Around 2 g of citric acid and 0.126 g NaF was dissolved in 40 ml of water. The pH of the solution was adjusted to 6 by adding $NH_4OH$ and the solution was heated to 75° C. Stoichiometric amounts of the nitrate salts of lanthanide ions were dissolved in 2 ml of methanol and added drop wise. A clear solution was obtained and after two hours of reaction, the resulting solution was mixed with 70 ml of ethanol to precipitate the nanoparticles. These particles were collected by centrifugation at 3000 rpm, washed with ethanol, and dried under vacuum. After drying the particles can easily be dispersed in water. Formation of citrate stabilized nanoparticles was confirmed from $^1H$ NMR and AFM studies (van Veggel c.s. Chem. Mater. 2005, 17, 4736).

Preparation of Sol-Gel Thin Films 50 mg of $Ln^{3+}$ doped $LaF_3$ nanoparticles were dissolved in 2 ml water, which was then mixed with 3 ml of tetraethoxyorthosilane (TEOS) and 7.8 ml of ethanol. The pH of the solution was adjusted to 2 by adding a few drops of 0.1 N HCl and the solution was stirred for 24 hours to get a clear sol. The sol was then spin coated on a quartz substrate at 2500 rpm and heated to 400° C. from 25° C. in 1.40 hr, staying at 400° C. for 30 min and then heated to 800° C. in 2 hr and staying at 800° C. for 12 hr under ambient environment. 1 mg of $La_{0.45}Yb_{0.5}Er_{0.05}F_3$, 100 mg of $La_{0.75}Yb_{0.2}Tm_{0.05}F_3$, and 150 mg of $Yb_{0.75}La_{0.2}Eu_{0.05}F_3$ in 4 ml water were used for the material which gave white light emission. Up-conversion emission spectra from the samples were measured using a 980 nm CW semiconductor laser source.

Results

FIG. 9 shows the up-conversion emission spectra of silica films made with $La_{0.45}Yb_{0.5}Er_{0.05}F_3$, $La_{0.75}Yb_{0.2}Tm_{0.05}F_3$, and $Yb_{0.75}La_{0.2}Eu_{0.05}F_3$ nanoparticles. Emission peaks at red, green and blue region can be seen. The calculated colour coordinates are 0.37 and 0.32.[35] These values fall within the white region of 1931 Commission Internationale de l'Eclairage (CIE) diagram.[37] This white light was bright and can been seen by the naked eye even at a laser pump power of only 200 mW. There is no virtually change in the colour coordinates of the white light with a change in the excitation power. The weak emissions at region 590 and 612 nm from $Eu^{3+}$ ions help keep the colour coordinates from moving slightly towards green region (0.3, 0.41). In order to show that using three different $Ln^{3+}/Yb^{3+}$ pairs in a silica thin film does not lead to a thin film capable of emitting white light, a thin film was prepared with the same concentrations of $La^{3+}$, $Er^{3+}$, $Tm^{3+}$, and $Eu^{3+}$ ions with $Yb^{3+}$ ions by direct incorporation and subjected to the same heat treatment. The results show only green and red emission from $Er^{3+}$ ions and no blue and red emission from $Tm^{3+}$ ions and $Eu^{3+}$ ions respectively (FIG. 10).

The emission band around 470 nm is assigned to the $^1G_4$ to $^3H_6$ transition of $Tm^{3+}$ ions. An emission band of $Tm^{3+}$ ions at 790 nm ($^3H_4$ to $^3H_6$ transition) was also observed. $Er^{3+}$ gave emission peaks around 515, 540 nm and 645 nm which are assigned to the $^2H_{11/2}$ to $^4I_{5/2}$, $^4S_{3/2}$ to $^4I_{5/2}$, $^4F_{9/2}$ to $^4I_{5/2}$ transitions, respectively. The intensity ratio of red to green emission from $Er^{3+}$ ions can be tuned by changing the concentration of $Yb^{3+}$ ions in the $Gd_2O_3$ nanoparticle (Guo, H.; Dong, N.; Yin, M.; Zhang, W.; Lou, L.; Xia, S. *J. Phys. Chem.* 2004, 108, 19205).

We also found similar green to red ratio dependence by changing the $Yb^{3+}$ concentration in the nanoparticle. The emission bands around 590 nm and 612 nm are assigned to the $^5D_0$ to $^7F_1$ and $^5D_0$ to $^7F_2$ transitions of $Eu^{3+}$ ions, respectively.

FIG. 11 shows the up-conversion spectra of $La_{0.75}Yb_{0.2}Ho_{0.05}F_3$ incorporated in silica film under 980 nm CW laser excitation. $Ho^{3+}$ ions gave two emission bands at approximately 540 nm and 640 nm, which are assigned to the $^5S_2$ to $^5I_8$ and $^5F_5$ to $^5I_8$ transitions, respectively. The green luminescence intensity is very high when compared with the red emission and can easily be seen with the naked eye at laser pump power of only 200 mW. This can be also used as green and red light source of the white light combination. Lifetime of $^5S_2$ level is 250 μs which indirectly shows that the up-conversion process is efficient. To our knowledge, no such studies have been reported regarding up-converted green and red emission from $Ho^{3+}$ ions in sol-gel derived oxide nanoparticles by exciting $Yb^{3+}$ ions. $Ln^{3+}$ ($Ho^{3+}$, $Tm^{3+}$, $Eu^{3+}$) ions with the $Yb^{3+}$ ions individually incorporated in silica thin film and subjected to same heat treatment didn't show any up-conversion. This clearly demonstrates the advantage of nanoparticles used in silica thin film rather than direct doping with lanthanide ions. The up-conversion luminescence can be improved by using $LaF_3:Ln^{3+}$ core-shell nanoparticles (the doped $LaF_3$ core is surrounded by an undoped shell of $LaF_3$) in the silica matrix and then used as precursor nanoparticles in the thin film formation.

Possible mechanisms for the up-conversion processes are, photoavalanche (PA), excited state absorption (ESA), energy transfer (ET). A schematic diagram showing the energy level of $Ho^{3+}$, $Tm^{3+}$, $Er^{3+}$, $Eu^{3+}$ and $Yb^{3+}$ as well as possible up-conversion mechanisms for the blue, green, and red emissions under 980 nm excitation are shown in FIGS. 12 and 13. FIG. 14 shows the dependence of the up-conversion emission intensity on the excitation power in different samples a) $La_{0.75}Yb_{0.2}Ho_{0.05}F_3$, b) $La_{0.75}Yb_{0.2}Tm_{0.05}F_3$, c) $La_{0.45}Yb_{0.5}Er_{0.05}F_3$ nanoparticles individually incorporated in silica film. Blue emission from $Tm^{3+}$ ions is three photon process. Green and red emission from $Er^{3+}$ and $Ho^{3+}$ ions are two photon processes. Power dependence graphs (FIG. 14) show a slight decrease in the slope when the laser power is increased. This can be attributed to a ground state depletion caused by the population build-up of the $Yb^{3+}$ excited level and in turn in the saturation of corresponding levels in the lanthanide ions.

When the $ZrO_2$ films were made with $La_{0.45}Yb_{0.5}Er_{0.05}F_3$, $La_{0.75}Yb_{0.2}Tm_{0.05}F_3$, and $Yb_{0.75}La_{0.2}Eu_{0.05}F_3$ nanoparticles white light was observed with the coordinates of 0.37, 0.31 (FIG. 15). A $ZrO_2$ thin film prepared with the same concentrations of $La^{3+}$, $Er^{3+}$, $Tm^{3+}$, and $Eu^{3+}$ ions with $Yb^{3+}$ ions by direct incorporation only showed green and red emission from $Er^{3+}$ ions and no blue and red emission from $Tm^{3+}$ ions and $Eu^{3+}$ ions, respectively, which substantiates the importance of the role of three different nanoparticles. Our recent report showed the presence of a non-stoichiometric lanthanum silicate phase ($La_{9.31}Si_{6.24}O_{26}$) along with the expected $LaF_3$ phase from X-ray diffraction (XRD) studies carried out on a silica thin film sample (van Veggel c.s. *Chem. Mater.* 2005, 17, 4736).

XRD studies carried out on $ZrO_2$ thin films made with nanoparticles showed the presence of lanthanum zirconate ($La_2Zr_2O_7$), but little or no $LaF_3$ (FIG. 16). We conclude that the nanoparticles have reacted with OH groups present in $ZrO_2$ sol-gel to form $Ln^{3+}$ doped lanthanum zirconate. In spite of the formation of lanthanum zirconate, the three pairs of $Ln^{3+}$ ions are spatially isolated in the sol-gel layer made with nanoparticles. Accordingly, the pairs of $Ln^{3+}$ ions are still effectively in a nanoparticle that has very low phonon energy (perhaps in the range of ~300 $cm^{-1}$).

TABLE 1

The life times in ms of $Er^{3+}$ ($^4I_{13/2}$), $Nd^{3+}$ ($^4F_{3/2}$) and $Ho^{3+}$ ($^5F_3$) ions in silica films when incorporated as nanoparticles and bare ions. All the samples were heated at 800° C. and the numbers in brackets indicate the relative percentages of the different life time components.

| | $LaF_3:Ln—SiO_2$ films[a] | | | | $Ln—SiO_2$ films[a] | |
|---|---|---|---|---|---|---|
| | Core | | Core-shell | | | |
| $Ln^{3+}$ | $\tau_1$ | $\tau_2$ | $\tau_1$ | $\tau_2$ | $\tau_1$ | $\tau_2$ |
| $Er^{3+}$ | 10.9 (95) | 3.9 (5) | [b] | [b] | 6.0 (70) | 1.2 (30) |
| $Nd^{3+}$ | 0.171 (72) | 0.056 (28) | 0.325 (76) | 0.087 (24) | 0.130 (52) | 0.002 (48) |
| $Ho^{3+}$ | 0.006 (75) | 0.012 (25) | 0.007 (65) | 0.015 (35) | [c] | [c] |

[a] Er/Si = 1.0 × $10^{-3}$, Nd/Si = 0.9 × $10^{-3}$ and Ho/Si = 1.6 × $10^{-3}$,
[b] measurements could not be done as the films were of poor quality.
[c] no emission observed.

TABLE 2

Life time values of $Er^{3+}$ ($^4I_{13/2}$) ions in silica films when incorporated as nanoparticles and bare ions and heated at different temperatures. The numbers in brackets gives the relative percentages of the two life time components.

| | $LaF_3:Er—SiO_2$ films Er/Si = 1 × $10^{-3}$ | | $Er^{3+}—SiO_2$ films Er/Si = 1 × $10^{-3}$ | |
|---|---|---|---|---|
| Temperature | $\tau_1$ ms (%) | $\tau_2$ ms (%) | $\tau_1$ ms (%) | $\tau_2$ ms (%) |
| 400° C. | 2.6 (70%) | 0.6 (30%) | A | [a] |
| 600° C. | 7.4 (69%) | 0.9 (31%) | 0.98 (35%) | 0.27(65%) |

[a] No emission observed

Example 3

Overview

Bright white light was generated from $SiO_2$ and $ZrO_2$ sol-gel thin film made with four different combinations of lanthanide-doped nanoparticles. A 33-fold increase in the white light emission intensity was observed with the Commission Internationale de l'Eclairage (CIE) co-ordinates of 0.39, 0.31 from silica thin film made with Combination 2 (Yb/Tm and Yb/Er) nanoparticles when compared to our previous thin film of Example 2. We have estimated the efficiency of production of the resulting white light as 25% based on the efficiency of energy transfer and quantum yield of the $Ln^{3+}$ emissions. Similarly, silica thin film made with combination 1 (Yb/Tm, Yb/Ho, and Yb/Er), combination 3 (Yb/Tm, Yb/Tb, and Yb/Er), and combination 4 (Yb/Tm, Yb/Tb, and Yb/Eu) nanoparticles also produced white light with higher efficiency when compared to our previous thin films of Example 2 (26, 11, 2 times, respectively). $ZrO_2$ thin films made with these new combinations of nanoparticles also showed similar increases in the efficiency of white light.

The combinations of $Ln^{3+}$-doped $LaF_3$ nanoparticles, stabilized by citrate ligands, incorporated in sol-gel thin films used to achieve the white light are given in Table 3. The films were transparent to visible light and no cracks were observed under an optical microscope. Film formation characteristics have been reported by us.[38] FIG. 17 shows the digital image of bright white light emission from silica thin film made with nanoparticles of combination 1 under 980 nm CW laser excitation. Bright white light can be seen very clearly from the thin film even at a laser pump power of only 300 mW.

FIG. 18*a* shows the up-conversion emission spectra of silica thin film made with nanoparticles of combination 1. Emission peaks at red, green and blue region can clearly be seen in FIG. 18*a*. The calculated CIE colour coordinates of the combination 1 are 0.39 and 0.31. These values fall within the white region of 1931 Commission Internationale de l'Eclairage (CIE) diagram. A 26-fold increase in the efficiency of generation of white light was observed when compared to our earlier thin film of Example 1. In this new combination red emission at 640 nm from $Ho^{3+}$ ions compensates for the absence of red emission from $Eu^{3+}$ ions and keeps the colour co-ordinates in the white light region. In addition, the energy transfer from $Yb^{3+}$ ions to $Ho^{3+}$ ions is very efficient when compared to co-operative up-conversion of $Yb^{3+}$ ions to $Eu^{3+}$ ions which makes our new combination overall more efficient. Like our previous thin film, there is virtually no change in the CIE colour coordinates of the white light with a change in the excitation power.

TABLE 3

Silica thin film made with different combination of nanoparticles (see Table 4 for amount of nanoparticle used.)

| Combination | $Ln^{3+}$ ions | $Yb^{3+}$ ion (mg) | Relative Efficiency[a] | CIE |
|---|---|---|---|---|
| 1 | Yb/Tm, Yb/Ho, Yb/Er | 7.58 | 26 | 0.39, 0.31 |
| 2 | Yb/Tm, Yb/Er | 7.68 | 33 | 0.30, 0.34 |
| 3 | Yb/Tm, Yb/Tb, Yb/Er | 23.8 | 11 | 0.29, 0.30 |
| 4 | Yb/Tm, Yb/Tb, Yb/Eu | 48.13 | 2 | 0.39, 030 |
| example 2 | Yb/Tm, Yb/Er, Yb/Eu | 66.35 | 1 | 0.37, 0.32 |

[a]relative to the total amount of $Yb^{3+}$ in example 2

TABLE 4

Amount of nanoparticles used for making thin films

| Combination | Amount of nanoparticles used |
|---|---|
| 1 | $La_{0.75}Yb_{0.20}Tm_{0.05}F_3$ (150 mg), $La_{0.75}Yb_{0.20}Ho_{0.05}F_3$ (0.5 mg) and $La_{0.45}Yb_{0.50}Er_{0.05}F_3$ (0.5 mg) |
| 2 | $La_{0.75}Yb_{0.20}Tm_{0.05}F_3$ (150 mg) and $Yb_{0.75}La_{0.20}Er_{0.05}$ (1 mg) |
| 3 | $La_{0.75}Yb_{0.20}Tm_{0.05}F_3$ (100 mg) $La_{0.45}Yb_{0.5}Er_{0.05}F_3$ (0.5 mg) and $Yb_{0.75}La_{0.20}Tb_{0.05}$ (100 mg) |
| 4 | $La_{0.75}Yb_{0.20}Tm_{0.05}F_3$ (100 mg) $Yb_{0.75}La_{0.20}Tb_{0.05}$ (80 mg) and $Yb_{0.75}La_{0.20}Eu_{0.05}$ (150 mg) |

Silica and zirconia thin films were made with 6 mL of TEOS and 4 mL of zirconium propoxide, respectively.

The emission band around 470 nm is assigned to the $^1G_4$ to $^3H_6$ transition of $Tm^{3+}$ ions. Both $Er^{3+}$ and $Ho^{3+}$ ions are responsible for green and red emission. $Er^{3+}$ ions gave emission peaks around 515, 540, and 665 nm, which are assigned to the $^2H_{11/2}$ to $^4I_{15/2}$, $^4S_{3/2}$ to $^4I_{15/2}$, $^4F_{9/2}$ to $^4I_{15/2}$ transitions, respectively. $Ho^{3+}$ ions gave two emission bands at approximately 540 nm and 640 nm, which are assigned to the $5S_2$ to $^5I_8$ and $^5F_5$ to $^5I_8$ transitions, respectively. A control silica thin film was made with the sane concentration of $La^{3+}$, $Er^{3+}$, $Ho^{3+}$, $Tm^{3+}$, and $Yb^{3+}$ ions by direct incorporation only showed green and red emission from $Er^{3+}$ ions, consistent with earlier observations. Silica thin films with $Ho^{3+}/Yb^{3+}$ or $Tm^{3+}/Yb^{3+}$ ions didn't show any up-conversion which also clearly demonstrates that different nanoparticles are necessary to produce white light.

FIG. 18*b* shows the up-conversion emission spectrum of silica thin film made with nanoparticles of combination 2. A 33-fold increase in the efficiency of white light generation was observed. The calculated CIE colour coordinates are 0.30 and 0.34. The efficiency generation of white light from combination 2 has been improved here in a different way than in combination 1 by increasing the red to green emission ratio from $Er^{3+}$ ions. The increase in the red to green emission ratio has been achieved by increasing the concentration of $Yb^{3+}$ in the nanoparticle. Zhang and co-workers[39] and Capobianco and co-workers[40] have also investigated this dependence of red to green ratio on $Yb^{3+}$ concentration in matrices like $Gd_2O_3$ and $Y_2O_3$, respectively.

An 11-fold and 2-fold increase in the efficiency of generation of white light has been achieved from combination 3 (FIG. 19) and combination 4 (FIG. 20), respectively. The emission peaks at 542, 586 and 623 nm are assigned to $^5D_4$ to $^7F_5$, $^7F_4$ and $^7F_3$ transitions of $Tb^{3+}$ ion, respectively. The co-operative up-conversion of Yb—Tb ions is more efficient than Yb—Eu ions because energy transfer can happen relatively easily from the virtual state (~490 nm) of two excited $Yb^{3+}$ ions to the $^5D_4$ level (490 nm) of $Tb^{3+}$ ions, where these two levels are resonant in energy. In the case of Yb—Eu up-conversion process some energy has to be dumped into the matrix during the energy transfer from the $Yb^{3+}$ ions to the $^5D_1$ level (520 nm) of $Eu^{+}$ ions. Gudel and co-workers[41] have reported co-operative up-converted emission mechanism in $Cs_3Tb_2Br_9$:$Yb^{3+}$ single crystal.

Preliminary results into the mechanism of the up-conversion process suggests that it is occurring via energy transfer (ET) rather than an excited state absorption (ESA). Up-conversion from $Tm^{3+}$ and $Eu^{3+}$ ions are due to energy transfer processes, because both ions have no ground or excited state absorption that matches the 980 nm photon. Green and red emission from $Er^{3+}$ ions are predominantly due to energy transfer processes and may be due to a photoavalanche (PA) process and little contribution is from $Er^{3+}$ excited state absorption, as can be seen from a silica thin film made with $La_{0.45}Yb_{0.5}Er_{0.05}F_3$ nanoparticles that showed intense luminescence when compared to a silica thin film made with $La_{0.95}Er_{0.05}F_3$ nanoparticles. The energy level of $Ho^{3+}$, $Tm^{3+}$, $Er^{3+}$, $Tb^{3+}$, $Eu^{3+}$ and $Yb^{3+}$ as well as possible up-conversion mechanisms for the blue, green, and red emissions under 980 nm excitation are given in the FIG. 21. We can calculate the efficiency of energy transfer ($\eta_\tau$) from $Yb^{3+}$ to $Ln^{3+}$ ions from $\eta_\tau = 1-(\tau_{DA}/\tau_D)$, Where, $\tau_{DA}$ is lifetime of donor in the presence of acceptor and $\tau_D$ is the lifetime of donor in the absence of acceptor.

The effective lifetime of the $^2F_{5/2}$ level of $Yb^{3+}$ ions in the silica thin film incorporated with $La_{0.45}Yb_{0.50}Y_{0.05}$ nanoparticles is 1.1 ms (FIG. 22a). Lifetime of $Yb^{3+}$ when it is co-doped with $Er^{3+}$ (FIG. 22b), $Ho^{3+}$ and $Tm^{3+}$ are 428 μs, 475 μs, and 600 μs, respectively. Thus, the efficiency of energy transfer to $Er^{3+}$, $Ho^{3+}$ and $Tm^{3+}$ were determined to be 0.6, 0.6 and 0.5, respectively. The effective lifetime $^1G_4$ level of $Tm^{3+}$ ions and $^5S_2$ level of $Ho^{3+}$ ions in the sample was found to be 300 μs ($\tau_R$=837 μs$^{42}$ and 378 μs, ($\tau_R$=489 μs$^{42}$, respectively. The effective lifetime of $^4S_{3/2}$ level and $^4F_{9/2}$ level of $Er^{3+}$ ions was found to be 525 μs ($\tau_R$=778 μs$^{|17|}$) and 418 μs, ($\tau_R$=1.4 ms$^{43}$) respectively. The effective lifetime of $^5D_0$ level of $Eu^{3+}$ and $^5D_4$ level of $Tb^{3+}$ ions was found to be 2.8 ms ($\tau_R$=6.7 ms$^{44}$) and 3.8 ms, ($\tau_R$=4.9 ms$^{45}$), respectively. The effective lifetimes and radiative lifetimes ($\tau_R$) of above lanthanide ions suggest that the estimated quantum yield (QY=$\tau_{eff}/\tau_R$) of resulting white light is on the order of 50%. Thus, the efficiency of the resulting white light is on the order of 25%. The power dependence of the up-conversion emission intensity of silica film individually made with $La_{0.75}Yb_{0.2}Ho_{0.05}F_3$ nanoparticles was measured (FIG. 23), showing that the green and red emission from $Ho^{3+}$ ions are two-photon processes. The power dependence graphs show a slight decrease in the slope when the laser power is increased. This can be attributed to a ground state depletion caused by the population build-up of the $Yb^{3+}$ excited level and in turn to the saturation of corresponding levels in the lanthanide ions. The green and red emission from $Er^{3+}$ ions are two-photon processes and the blue emission from $Tm^{3+}$ ions is a three-photon process.

In order to substantiate further the generality of the method, above experiments were repeated by taking $ZrO_2$ as the sol-gel matrix. Similar to $SiO_2$ matrix, white light was observed with the $ZrO_2$ films made with combination 1 (FIG. 24), combination 2 (FIG. 25), and combination 3 (FIG. 26) nanoparticles. $ZrO_2$ thin films made with these combinations of nanoparticles also showed similar increase in the efficiency of white light like silica thin film. The calculated CIE colour co-ordinates for combination 1 and combination 2 are 0.37, 0.40 and 0.34, 0.29 respectively. The calculated CIE colour co-ordinates for combination 3 are 0.34 and 0.37. A $ZrO_2$ thin film prepared with the same concentrations of $La^{3+}$, $Er^{3+}$, $Tm^{3+}$, and $Ho^{3+}$ ions with $Yb^{3+}$ ions by direct incorporation only showed green and red emission from $Er^{3+}$ ions and no emission from $Tm^{3+}$ ions and $Ho^{3+}$ ions was observed. Similarly, $ZrO_2$ thin film prepared with the same concentrations of $La^{3+}$, $Tb^{3+}$, $Tm^{3+}$, and $Er^{3+}$ ions with $Yb^{3+}$ ions showed green and red emission which is from $Er^{3+}$ ions. This again substantiates the importance of the role of three different nanoparticles to produce white light.

In conclusion, up to a 33-fold increase in the efficiency of the conversion of 980 nm light into white light has been achieved in sol-gel derived thin films by a judicious choice of upconverting $Ln^{3+}$-doped nanoparticles that were co-doped with $Yb^{3+}$.

Experimental: For nanoparticles amounts see Table 4. Effective lifetimes were calculated using Origin 7 software based on the following equation, $$\tau_{eff} = \frac{\int_0^\infty tI(t)dt}{\int_0^\infty I(t)dt}$$

All the calculations were done based on duplicate measurements and the values have estimated errors of 5%.

The foregoing is a description of embodiments of the invention. As would be known to one skilled in the art, variations would be contemplated that would not alter the scope of the invention. For example, this method can be extended to other luminescent $Ln^{3+}$ ions, i.e. Ce, Pr, Sm, Gd, Tb, Dy, Tm, or Yb, other nanoparticles, and to other matrices for example, but not limited to $TiO_2$, $ZrO_2$, $HfO_2$, $Ta_2O_5$, $Nb_2O_5$, $GeO_2$, $Y_2O_3$, and $Gd_2O_3$. Further, other carboxylates can be employed, provided that they are substantially removed during heating of the sol-gel, as can some neutral molecules. White light can easily be generated by incorporating $Ln^{3+}$ doped nanoparticles in sol-gel thin films other than $SiO_2$ and $ZrO_2$, for example, but not to be limiting, $Y_2O_3$, $Gd_2O_3$, $TiO_2$, $Al_2O_3$, $GeO_2$, $HfO_2$, $Nb_2O_5$, $Ta_2O_5$ either individually or in combination. Additionally, other core-shell nanoparticles could be used comprising lanthanides suitable for the production of core-shell nanoparticles. In general, other nanoparticles, such as oxides, could be used as well. Additionally, the foregoing methods and products can be used to produce individual colors of light. For example, but not limited to, green and some red via nanoparticles as shown in FIG. 14a, blue via nanoparticles as shown in FIG. 14b, and red and some green via nanoparticles as shown in FIG. 14c.

$Yb^{3+}/Eu^{3+}/Er^{3+}/Tm^{3+}/La^{3+}$ in $SiO_2$ or $ZrO_2$ produces green and red from $Er^{3+}$. The fact that there is no light generate from $Eu^{3+}$ and $Tm^{3+}$ could be a result of energy transfer to $Er^{3+}$ and/or quenching of the excited $Eu^{3+}$ and $Tm^{3+}$, leading to non-radiative decay, when not introduced via the precursor nanoparticles.

5. REFERENCE

[1] S. Bhandarkar, J. Am. Ceram. Soc. 87, 1180 (2004).
[2] L. H. Slooff, M. J. A. de Dood, A. van Blaaderen and A. Polman, J. Non-Cryst. Solids 296, 158 (2001).
[3] S. Y. Chen. C. C. Ting and W. F. Hsieh, Thin Solid Films 434, 171 (2003).
[4] Z. Elalamy, E. Drouard, T. Mcgovern L. Escoubas, J. J. Simon and F. Flory, Opt. Comm. 235, 365 (2004).
[5] T. Ishizaka and Y. Kurokawa, J. Appl. Phys. 90, 243 (2001).
[6] K. Kojima, K. Tsuchiya and N. Wada, J. Sol-gel Sci. and Tech. 19, 511 (2000).
[7] L. Zamperdi, M. Ferrari, C. Armellini, F. Visintainer, C. Tosello, S. Ronchin, R. Rolli, M. Montagna, A. Chiasera, S. Pelli, G. C. Righini, A. Monteil, C. Duverger and P. R. Goncalves, J. Sol-Gel. Sci. Technol. 26, 1033 (2003).
[8] Q. Xiang, Y. Zhou, B. S. Ooi, Y. L. Lam, Y. C. Chan and C. H. Kam, Thin Solid Films 370, 243 (2000).
[9] A. Bahtat, M. C. Marco de Lucas, B. Jacquier, B. Varvel, M. Bouazoui and J. Mugnier, Opt. Mater. 7, 173 (1997).
[10] O. Lumholt, T. Rasmissen and A. Bjarklev. Electron. Lett. 29, 495 (1993).
[11] P. Blixt, J. Nilsson, T. Carlnas and B. Jaskorzynska, IEEE Photonics Technol. Lett. 3, 996 (1991).
[12] A. Biswas, G. S. Maciel, R. Kapoor, C. S. Friend and P. N. Prasad, Appl. Phys. Lett. 15, 2389 (2003).
[13] A. Biswas, G. S. Maciel, R. Kapoor, C. S. Friend and P. N. Prasad, J. Non-Cryst. Solids 316, 393 (2003).
[14] S. Tanabe, H. Hayashi, T. Hanada and N. Onodera, Opt. Mat. 19, 343 (2002).
[15] E. M. Yeatman, M. M. Ahmad, O. Mccarthy, A. Martucci and M. Guglielmi, J. Sol-Gel. Sci. Tech. 19, 231 (2000).
[16] L. H. Slooff, M. J. A. de Dood, A. van Blaaderen and A. Polman, Appl. Phys. Lett. 76, 3682 (2000).
17 Adachi, C.; Baldo, M. A.; Thompson, M. E.; Forrest, S. R. *J. Appl. Phys.* 2001, 90, 5048.
18 Köhler, A.; Wilson, J. S.; Friend, R. H. *Adv. Mater.* 2002, 14, 701.

19 Bernius, M. T.; Inbasekaran, M.; O'Brien, J.; Wu, W. *Adv. Mater.* 2000, 12, 1737.
20 Cheng, J-A.; Chen, C. H. *J. Mater. Chem.* 2005, 15, 1179.
21 Tang, C. W.; VanSlyke, S. A. *Appl. Phys. Lett.* 1987, 51, 913.
22 Chen, C-T. *Chem. Mater.* 2004, 16, 4389.
23 Sheets J. R. *Science* 1997, 277, 191.
24 Park, J. H.; Lee, T-W.; Kim, Y. C.; Park, O O.; Kim, J. K. *Chem. Phys. Lett.* 2005, 403, 293.
25 Park, J. H.; Lee, T-W.; Kim, Y. C.; Park, O O.; Kim, J. K. *Chem. Phys. Lett.* 2005, 403, 293.
26 Bernius, M. T.; Inbasekaran, M.; O'Brien, J.; Wu, W. *Adv. Mater.* 2000, 12, 1737.
27 Wu, S-J.; Chen, M-F.; Chen, C-T.; Song, Y-W.; Chi, Y.; Ho, M-H.; Su, S-F.; Chen, C-H. *Adv. Mater.* 2005, 17, 285.
28 Zhang. X. H.; Liu, M. W.; Wong, O. Y.; Lee, C. S.; Kwong, H. L.; Lee, S. T.; Wu, S. K. *Chem. Phys. Lett.* 2003, 369, 478.
29 Chuen, C. H.; Tao, Y. T. *Appl. Phys. Lett.* 2002, 81, 4499.
30 Duggal, A. R.; Foust, D. F.; Nealon, W. F.; Heller, C. M. *Appl. Phys. Lett.* 2003, 82, 2580.
31 Zhou, X.; He, J.; Liao, L. S.; Lu, M.; Ding, X. M.; Hou, X. Y.; Zhang, X. M.; He, X. Q.; Lee, S. T.; *Adv. Mater.* 2000, 12, 265.
32 Feldmann, C.; Justel, T.; Ronda, C. R.; Schmidt, P. J. *Adv. Funct. Maier.* 2003, 13, 511.
33 D'Andrade, B. W.; Thomson, M. E.; Forest, S. R. *Adv. Mater.* 2002, 14, 147.
34 Wright. J. C. *Top. in Appl. Phys.* 1976, 15, 239.
35 C. Cannas. M. Casu, M. Miainas, A. Musinu, G. Piccaluga, S. Polizzi, A. Speghilni and M. Bettinelli. J. Mater. Chem. 13, 3079 (2003).
36 T. Ishizaka and Y. Kurokawa J. Lumin. 92, 57 (2001).
37 CIE. *Colorimetry (Official Recommendations of the International Commission on Illumination)*; CIE Publication No. 15, CIE: Paris 1971.
38 Dekker, R.; Sudarsan, V.; van Veggel, F. C. J. M.; Worhoff, K.; Driessen A. Proceedings symposium IEEE/LEOS Benelux Chapter; Ghent, 2004, 295.
39 H. Guo, N. Dong, M. Yin, W. P. Zhang, L. R. Lou, S. D. Xia, *J. Phys. Chem. B* 2004, 108, 19205.
40 F. Vetrone, J. C. Boyer, J. A. Capobianco, A. Speghini, M. Bettinelli, *J. Phys. Chem. B* 2003, 107, 1107.
41 G. M. Salley, R. Valiente, H. U. Gudel, *Phys. Rev. B* 2003, 67.
42 B. M. Walsh, N. P. Barnes, B. Di Bartolo, *J. Appl. Phys.* 1998, 83, 2772.
43 R. Sosa, I. Foldvari, A. Watterich, A. Munoz, R. S. Maillard, G. Kugel, *J. Lumin.* 2005, 111, 25.
44 M. U. V. Werts, R. T. F. Jukes, J. W. Verhoeven, *Phys. Chem. Chem. Phys.* 2002, 4, 1542.
45 K. Binnemans, R. Van Deun, C. Gorller-Walrand, J. L. Adam, *J. Non-Cryst. Solids,* 1998, 238, 11.

The invention claimed is:

1. A method of preparing a light emitting lanthanide-doped product nanoparticle sol-gel matrix film, said method comprising:
preparing precursor nanoparticles comprising lanthanides selected to produce at least one of green, red or blue light when excited with near infrared light;
stabilizing said nanoparticles with ligands operative to stabilize the nanoparticles in an aqueous solution and selected to be substantially removed from the sol-gel matrix film during its synthesis;
incorporating said stabilized nanoparticles into a sol-gel matrix; and
heating said lanthanide doped nanoparticle sol-gel matrix to a temperature suitably selected to increase the signal to noise ratio of the luminescence by substantially removing low molecular weight organic molecules, water and hydroxyl groups, thereby preparing light emitting lanthanide doped product nanoparticle sol-gel matrix film.

2. The method of claim 1 wherein said ligands are low molecular weight organic molecules.

3. The method of claim 2 wherein said low molecular weight molecules comprise at least one negatively charged group.

4. The method of claim 3 wherein said low molecular weight organic molecules are carboxylates.

5. The method of claim 4 wherein said carboxylate is citrate.

6. The method of claim 5 wherein said temperature is in the range of approximately 400-1,200° C.

7. The method of claim 6 wherein said temperature is in the range of approximately 600-1,200° C.

8. The method of claim 7 wherein said temperature is approximately 800° C.

9. The method of claim 3 further comprising spin coating said sol-gel.

10. The method of claim 3 wherein said sol-gel comprises one or more of silica, alumina, zirconia, titania, hafnia, tantalum pentoxide, niobium pentoxide, germanium dioxide, yttrium oxide ($Y_2O_3$), and gadolinium oxide ($Gd_2O_3$).

11. The method of claim 10 wherein said precursor nanoparticles selected from the group consisting of $LaF_3$:Ln (Ln=Ce, Pr, Nd, Sm, Eu, Gd, Tb, Dy, Ho, Er, Tm, Yb).

12. The method of claim 10 wherein said precursor nanoparticles comprise a metal halide salt.

13. The method of claim 12 wherein said precursor nanoparticles comprise a metal fluoride salt.

14. The method of claim 13 wherein said metal fluoride salt is $LaF_3$.

15. The method of claim 1 wherein said precursor nanoparticles comprise at least one of:
$MF_3$:Ln (M=La, Gd, Lu, Y, Sc; Ln=Ce, Pr, Nd, Sm, Eu, Gd, Tb, Dy, Ho, Er, Tm, Yb);
$M^1M^2F_4$:Ln ($M^1$=Li, Na, K, Rb, Cs; $M^2$=La, Gd, Lu, Y, Sc; Ln=Ce, Pr, Nd, Sm, Eu, Gd, Tb, Dy, Ho, Er, Tm, Yb); and
$MF_2$:Ln (M=Be, Mg, Ca, Sr, Ba; Ln=Ce, Pr, Nd, Sm, Eu, Gd, Tb, Dy, Ho, Er, Tm, Yb).

16. The method of claim 1 wherein said precursor nanoparticles are selected from $La_{0.75}Yb_{0.2}Tm_{0.05}F_3$, $Yb_{0.75}La_{0.20}Eu_{0.05}F_3$, $Yb_{0.75}La_{0.20}Tb_{0.05}F_3$, $La_{0.45}Yb_{0.5}Er_{0.05}F_3$, and $La_{0.75}Yb_{0.2}Ho_{0.05}F_3$.

17. The method of claim 16, wherein said nanoparticles are synthesized in a ratio of about 150 $La_{0.75}Yb_{0.2}Tm_{0.05}F_3$, to 0.5 $La_{0.45}Yb_{0.5}Er_{0.05}F_3$ to 0.5 $La_{0.75}Yb_{0.2}Ho_{0.05}F_3$ or 100 $La_{0.75}Yb_{0.2}Tm_{0.05}F_3$, to 0.5 $La_{0.45}Yb_{0.5}Er_{0.05}F_3$ to 100 $La_{0.20}Yb_{0.75}Tb_{0.05}F_3$ or 100 $La_{0.75}Yb_{0.2}Tm_{0.05}F_3$, to 80 $Yb_{0.75}La_{0.2}Eu_{0.05}F_3$ to 80 $La_{0.20}Yb_{0.75}Tb_{0.05}F_3$ or 150 $La_{0.75}Yb_{0.2}Tm_{0.05}F_3$, to 1 $La_{0.20}Yb_{0.75}Er_{0.05}F_3$.

18. A lanthanide-doped nanoparticle sol-gel film comprising product nanoparticles prepared from precursor nanoparticles comprising lanthanides selected to produce at least one of green, red or blue light when excited with near infrared light, the precursor nanoparticles being selected from $LaF_3$:Ln (Ln=Ce, Pr, Nd, Sm, Eu, Gd, Tb, Dy, Ho, Er, Tm, Yb) and combinations thereof.

19. The lanthanide-doped nanoparticle sol-gel film of claim 18 wherein said precursor nanoparticles are stabilized with ligands operative to stabilize the precursor nanoparticles in an aqueous medium and selected to be substantially removed from the sol-gel matrix film during synthesis.

20. The lanthanide-doped nanoparticle sol-gel film of claim 19 wherein said precursor nanoparticles are selected from $La_{0.75}Yb_{0.2}Tm_{0.05}F_3$, $Yb_{0.75}La_{0.20}Eu_{0.05}F_3$, $Yb_{0.75}La_{0.20}Tb_{0.05}F_3$, $La_{0.45}Yb_{0.5}Er_{0.05}F_3$, and $La_{0.75}Yb_{0.2}Ho_{0.05}F_3$; and are provided in a ratio of about 150 $La_{0.75}Yb_{0.2}Tm_{0.05}F_3$, to 0.5 $La_{0.45}Yb_{0.5}Er_{0.05}F_3$ to 0.5 $La_{0.75}Yb_{0.2}Ho_{0.05}F_3$ or 100 $La_{0.75}Yb_{0.2}Tm_{0.05}F_3$, to 0.5 $La_{0.45}Yb_{0.5}Er_{0.05}F_3$ to 100 $La_{0.20}Yb_{0.75}Tb_{0.05}F_3$ or 100 $La_{0.75}Yb_{0.2}Tm_{0.05}F_3$, to 80 $Yb_{0.75}La_{0.2}Eu_{0.05}F_3$ to 150 $La_{0.20}Yb_{0.75}Tb_{0.05}$ or 150 $La_{0.75}Yb_{0.2}Tm_{0.05}F_3$, to 1 $La_{0.20}Yb_{0.75}Er_{0.05}F_3$.

21. A lanthanide-doped nanoparticle sol-gel film comprising product nanoparticles prepared from precursor nanoparticles comprising lanthanides selected to produce at least one of green, red, or blue light when excited with near infrared light, the precursor nanoparticles comprising at least one of:
$MF_3$:Ln (M=La, Gd, Lu, Y, Sc; Ln=Ce, Pr, Nd, Sm, Eu, Gd, Tb, Dy, Ho, Er, Tm, Yb);
$M^1M^2F_4$:Ln $M^1$=Li, Na, K, Rb, Cs; $M^2$=La, Gd, Lu, Y, Sc; Ln=Ce, Pr, Nd, Sm, Eu, Gd, Tb, Dy, Ho, Er, Tm, Yb); and
$MF_2$:Ln (M, Be, Mg, Ca, Sr, Ba; Ln=Ce, Pr, Nd, Sm, Eu, Gd, Tb, Dy, Ho, Er, Tm, Yb).

22. A method for the production of light, said method comprising:
selecting lanthanides for the production of at least one of green, red and blue light when excited with near infrared light;
preparing precursor nanoparticles comprising the selected lanthanides;
stabilizing said nanoparticles with ligands operative to stabilize the nanoparticles in an aqueous solution and selected to be substantially removed from the sol-gel matrix film during synthesis;
preparing a sol-gel matrix made with said nanoparticles;
heating said sol-gel matrix to a temperature suitably selected to increase the signal to noise ratio of the luminescence by substantially removing said low molecular weight organic molecules; and
exciting said light emitting lanthanide doped product nanoparticle sol-gel films with near infrared light.

23. The method of claim 22 wherein said near infrared light excites $Yb^{3+}$.

24. The method of claim 23 wherein said near infrared light is 980 nm.

25. The method of claim 5 wherein said temperature ranges from about 400° C. to about 800° C.

26. A method of preparing a light emitting lanthanide-doped product nanoparticle sol-gel matrix film, said method comprising:
preparing precursor nanoparticles selected from $La_{0.75}Yb_{0.2}Tm_{0.05}F_3$, $Yb_{0.75}La_{0.20}Eu_{0.05}F_3$, $Yb_{0.75}La_{0.20}Tb_{0.05}F_3$, $La_{0.45}Yb_{0.5}Er_{0.05}F_3$, and $La_{0.75}Yb_{0.2}Ho_{0.05}F_3$, and are provided in a ratio of about 150 $La_{0.75}Yb_{0.2}Tm_{0.05}F_3$, to 0.5 $La_{0.45}Yb_{0.5}Er_{0.05}F_3$ to 0.5 $La_{0.75}Yb_{0.2}Ho_{0.05}F_3$ or 100 $La_{0.75}Yb_{0.2}Tm_{0.05}F_3$, to 0.5 $La_{0.45}Yb_{0.5}Er_{0.05}F_3$ to 100 $La_{0.20}Yb_{0.75}Tb_{0.05}F_3$ or 100 $La_{0.75}Yb_{0.2}Tm_{0.05}F_3$, to 80 $Yb_{0.75}La_{0.2}Eu_{0.05}F_3$ to 150 $La_{0.20}Yb_{0.75}Tb_{0.05}$ or 150 $La_{0.75}Yb_{0.2}Tm_{0.05}F_3$, to 1 $La_{0.20}Yb_{0.75}Er_{0.05}F_3$;
stabilizing said nanoparticles with ligands operative to stabilize the nanoparticles in an aqueous solution and selected to be substantially removed from the sol-gel matrix film during its synthesis;
incorporating said stabilized nanoparticles into a sol-gel matrix; and
heating said lanthanide doped nanoparticle sol-gel matrix to a temperature suitably selected to increase the signal to noise ratio of the luminescence by substantially removing low molecular weight organic molecules, water and hydroxyl groups, thereby preparing light emitting lanthanide doped product nanoparticle sol-gel matrix film.

\* \* \* \* \*